United States Patent
Mizoguchi et al.

(10) Patent No.: US 7,751,861 B2
(45) Date of Patent: Jul. 6, 2010

(54) PORTABLE TELEPHONE AND ELECTRONIC EQUIPMENT WITH OPTICAL SIGNAL TRANSMISSION BETWEEN HOUSING SECTIONS FOR HIGH SPEED SIGNAL NOISE ELIMINATION

(75) Inventors: Takatoshi Mizoguchi, Gojo (JP); Nobuyuki Ohe, Katsuragi (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 615 days.

(21) Appl. No.: 11/712,408

(22) Filed: Mar. 1, 2007

(65) Prior Publication Data

US 2007/0206907 A1 Sep. 6, 2007

(30) Foreign Application Priority Data

Mar. 2, 2006 (JP) ............................ 2006-055712
Dec. 25, 2006 (JP) ............................ 2006-348058

(51) Int. Cl.
*H04M 1/00* (2006.01)
(52) U.S. Cl. .................. 455/575.3; 455/90.1; 385/143; 385/24
(58) Field of Classification Search ............... 455/90.1, 455/90.3, 575.1, 575.3
See application file for complete search history.

(56) References Cited

U.S. PATENT DOCUMENTS

| 5,539,846 | A | * | 7/1996 | Morikura et al. ............... 385/24 |
| 6,344,977 | B1 | | 2/2002 | Takagi |
| 7,039,322 | B1 | * | 5/2006 | Yoshimura et al. ........... 398/141 |
| 2003/0087610 | A1 | * | 5/2003 | Ono ............................ 455/90 |
| 2005/0116176 | A1 | * | 6/2005 | Aguirre et al. ............ 250/492.1 |
| 2007/0032275 | A1 | * | 2/2007 | Suzuki et al. ............. 455/575.3 |

FOREIGN PATENT DOCUMENTS

| JP | 2001-119460 A | 4/2001 |
| JP | 2005-65076 A | 3/2005 |
| JP | 2005-252334 A | 9/2005 |

* cited by examiner

*Primary Examiner*—Nick Corsaro
*Assistant Examiner*—Chuong A Ngo
(74) *Attorney, Agent, or Firm*—Birch, Stewart, Kolasch & Birch, LLP

(57) ABSTRACT

The portable telephone has an optical signal transmission section 100 for performing signal transmission between a first casing 101 and a second casing 102 by optical signals. A need for any complex electromagnetic shield structure can be eliminated. There is no occurrence of electromagnetic-wave noise from an optical signal transmission section 100. Thus, electromagnetic-wave noise of the whole portable telephone can be extremely reduced.

17 Claims, 30 Drawing Sheets

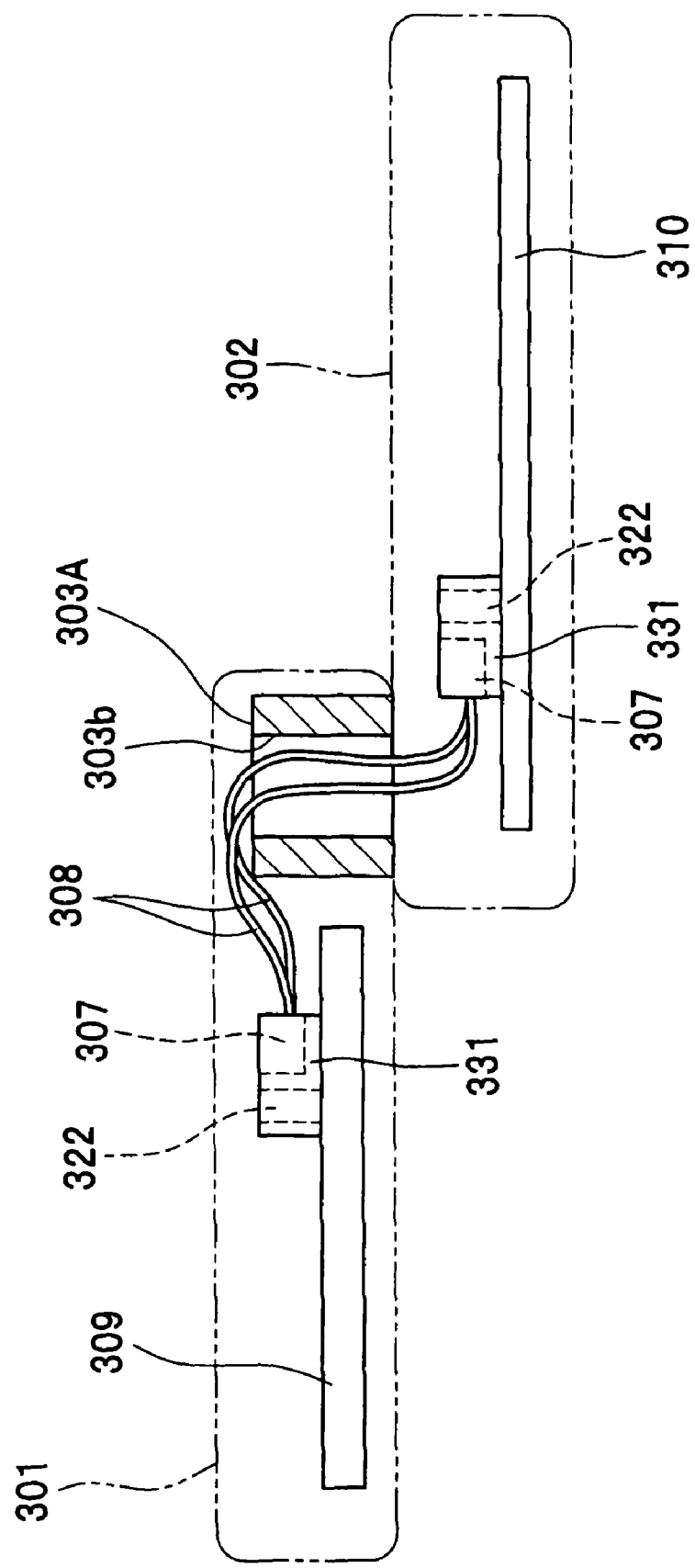

PORTABLE TELEPHONE AND ELECTRONIC EQUIPMENT WITH OPTICAL SIGNAL TRANSMISSION BETWEEN HOUSING SECTIONS FOR HIGH SPEED SIGNAL NOISE ELIMINATION

CROSS-REFERENCE TO RELATED APPLICATIONS

This nonprovisional application claims priority under 35 U.S.C. §119(a) on Patent Application No. 2006-055712 filed in Japan on Mar. 2, 2006 and on Patent Application No. 2006-348058 filed in Japan on Dec. 25, 2006, the entire contents of which are hereby incorporated by reference.

BACKGROUND OF THE INVENTION

The present invention relates to a portable telephone and electronic equipment for performing signal transmission by optical signals.

Conventionally, as shown in FIG. 17, there has been a portable telephone which has a first casing 1 having a display panel, and a second casing 2 having an operation panel (see JP 2001-119460 A). The first casing 1 and the second casing 2 are coupled to each other so as to be foldable or developable.

As shown in FIGS. 18A and 18B, the first casing 1 and the second casing 2 are coupled to each other with flexible cables 6 to fulfill signal transmission by electric signals. In more detail, circuit boards 4, 5 are provided in the first casing 1 and the second casing 2, respectively. The circuit board 4 of the first casing 1 and the circuit board 5 of the second casing 2 are coupled to each other with the flexible cables 6. The flexible cables 6 and the circuit boards 4, 5 are connected to each by connectors 7, 8, respectively.

In such transmission of electric signals, generally, electro-magnetic-wave noise that occurs from the flexible cables 6 increases in level with increasing signal transmission speed, giving rise to a need for shielding the flexible cables 6.

Therefore, in a conventional portable telephone, a coaxial type flexible cables as shown in FIG. 19 is used as the flexible cables, by which the flexible cable 6 is shielded.

In more detail, the flexible cable 6 has a spacer portion 13 with an internal conductor pattern 12 contained at its center, a base 14 and an inner-side upper cover lay 15 between which the spacer portion 13 is sandwiched from above and below, and a top cover lay 16 and a bottom cover lay 17 with which the base 14 and the upper cover lay 15 are covered from above and below, respectively.

The base 14 has a strip pattern 14a at a center of a bottom surface, and a signal-transmission pattern 14b on both sides of the top surface. The upper cover lay 15 has a strip pattern 15a at a center of the top surface. The top cover lay 16 covers the strip pattern 15a. The bottom cover lay 17 covers the strip pattern 14a.

In the upper cover lay 15 and the base 14, through holes 22 are formed so as to extend through the upper cover lay 15 and the base 14. With these through holes 22, the strip pattern 15a and the strip pattern 14a are electrically connected to each other.

The internal conductor pattern 12 forms an internal conductor. The strip patterns 15a, 14a and the through holes 22 form external conductors.

Then, even if a high-speed signal is transmitted to the internal conductor pattern 12, the flexible cable 6, which is of a coaxial structure, inhibits electromagnetic waves from leaking to the outside from the flexible cable 6.

However, in this conventional portable telephone, for example, treating high-definition dynamic images involves higher-speed transmission of signals, so that the occurrence of electromagnetic-wave noise comes to matter with increasing transmission speed. Further, countermeasures against electromagnetic waves by the shielding of the flexible cable would cause the complexing of the structure as well as the increasing of size, which matters in uses with limited spaces such as in portable telephones.

SUMMARY OF THE INVENTION

Accordingly, an object of the present invention is to provide a portable telephone which is less subject to occurrence of electromagnetic-wave noise in high-speed signal transmission inside portable telephones and which is low in cost.

In order to achieve the above object, there is provided a portable telephone comprising:

a first casing having a display panel;

a second casing which has an operation panel and which is coupled to the first casing so as to be foldable or developable; and an optical signal transmission section for performing signal transmission between the first casing and the second casing by optical signals.

In this case, the transmission method of the optical signal transmission section includes the optical space transmission method, in which an optical signal is passed in the air, and the optical fiber transmission method, in which an optical signal is passed through a thin tube of quartz or the like.

In the portable telephone of this invention, since the optical signal transmission section for performing signal transmission between the first casing and the second casing by optical signals is included, there is no occurrence of electromagnetic-wave noise from the optical signal transmission section, so that electromagnetic-wave noise of the whole portable telephone can be reduced to an extreme extent. Also, the shield for the optical signal transmission section is no longer necessitated, making it possible to achieve a space saving, which is suited for internal connections of a compact portable telephone.

In one embodiment of the invention, a transmission speed of the optical signal transmission section is 400 Mbps or more.

In the portable telephone of this embodiment, since the transmission speed of the optical signal transmission section is 400 Mbps or more, even transmitting a high-speed signal does not cause occurrence of electromagnetic-wave noise from the optical signal transmission section, which is suited for transmission of high-speed signals.

In one embodiment of the invention, the optical signal transmission section includes:

a light transmitting part which is placed in either one of the first casing or the second casing and which transmits an optical signal;

a light receiving part which is placed in the other one of the first casing or the second casing and which receives an optical signal; and an optical transmission medium which is stretched between the first casing and the second casing so as to couple the light transmitting part and the light receiving part to each other, wherein an optical signal transmitted from the light transmitting part is received by the light receiving part via the optical transmission medium.

In this case, the optical transmission medium includes the optical waveguide and the fiber cable.

In the portable telephone of this embodiment, the optical signal transmission section has the light transmitting part, the light receiving part and the optical transmission medium, where an optical signal transmitted from the light transmitting part is received by the light receiving part via the optical transmission medium. Thus, the signal can be transmitted by the optical transmission medium with reliability.

In one embodiment of the invention, the optical transmission medium is a single-core plastic optical fiber cable.

In the portable telephone of this embodiment, since the optical transmission medium is a single-core plastic optical fiber cable, it becomes possible to fulfill high-speed optical fiber transmission, so that the signal cables can be mounted in a smaller number with high flexibility. Thus, a portable telephone which is low in cost, less subject to occurrence of electromagnetic-wave noise, and compact in size can be manufactured. Moreover, when one optical fiber cable is used to perform one-core full duplex communications, it also becomes possible to perform bidirectional transmission with one optical fiber cable.

In one embodiment of the invention, the optical transmission medium is a multi-core plastic optical fiber cable.

In the portable telephone of this embodiment, since the optical transmission medium is a multi-core plastic optical fiber cable, it becomes possible to fulfill high-speed optical fiber transmission, so that the signal cables can be mounted in a smaller number with even higher flexibility. Thus, a compact portable telephone which is less subject to occurrence of electromagnetic-wave noise can be manufactured.

In one embodiment of the invention, the optical transmission medium is a multi-core glass fiber cable.

In the portable telephone of this embodiment, since the optical transmission medium is a multi-core glass fiber cable, it becomes possible to fulfill even higher-speed optical fiber transmission, so that the signal cables can be mounted in a smaller number with high flexibility. Thus, a compact portable telephone which is less subject to occurrence of electromagnetic-wave noise can be manufactured.

In one embodiment of the invention, the light transmitting part is an LED having an emission wavelength of $650\pm50$ nm.

In the portable telephone of this embodiment, since the light transmitting part is an LED having an emission wavelength of $650\pm50$ nm, it becomes possible to perform optical signal transmission with good optical transmission efficiency, and the need for any electromagnetic shield structure is eliminated, as compared with conventional flexible cables for electric signals. Thus, a low-cost, compact portable telephone can be manufactured.

In one embodiment of the invention, the optical transmission medium is a PCS fiber cable.

In the portable telephone of this embodiment, since the optical transmission medium is a PCS (Polymer Clad Silica) fiber cable, it becomes possible to fulfill high-speed optical fiber transmission, so that the signal cables can be mounted in a smaller number with even higher flexibility. Thus, a compact portable telephone which is less subject to occurrence of electromagnetic-wave noise can be manufactured.

In one embodiment of the invention, the light transmitting part is a VCSEL having an emission wavelength of 600 nm to 900 nm.

In the portable telephone of this embodiment, since the light transmitting part is a VCSEL having an emission wavelength of 600 nm to 900 nm, it becomes possible to perform optical signal transmission with good optical transmission efficiency, and the need for any electromagnetic shield structure is eliminated, as compared with conventional flexible cables for electric signals. Thus, a low-cost, compact portable telephone can be manufactured.

In one embodiment of the invention, the optical transmission medium is a flexible-board type waveguide.

In the portable telephone of this embodiment, since the optical transmission medium is a flexible-board type waveguide, the need for any electromagnetic shield structure is eliminated, as compared with conventional flexible cables for electric signals. Also, one flexible-board type waveguide makes it possible to perform concurrent multi-channel transmission, allowing higher-speed transmission to be achieved. Thus, a low-cost, compact portable telephone can be manufactured.

In one embodiment of the invention, the light transmitting part is an LED array having an emission wavelength of $650\pm50$ nm.

In the portable telephone of this embodiment, since the light transmitting part is an LED array having an emission wavelength of $650\pm50$ nm, the light transmitting part can be provided as a compact one so that a portable telephone which is less subject to occurrence of electromagnetic-wave noise, compact and capable of higher-speed signal transmission can be manufactured.

In one embodiment of the invention, the light transmitting part is a VCSEL array having an emission wavelength of 600 nm to 900 nm.

In the portable telephone of this embodiment, since the light transmitting part is a VCSEL array having an emission wavelength of 600 nm to 900 nm, the light transmitting part can be provided as an even higher-speed, more compact one. Thus, a portable telephone which is less subject to occurrence of electromagnetic-wave noise, compact and capable of higher-speed signal transmission can be manufactured.

In one embodiment of the invention, the light receiving part is a photodiode array.

In the portable telephone of this embodiment, since the light receiving part is a photodiode array, the light receiving part can be provided as a compact one, so that a portable telephone which is less subject to occurrence of electromagnetic-wave noise, compact and capable of higher-speed signal transmission can be manufactured.

In one embodiment of the invention, the optical signal transmission section includes;

a light transmitting part which is placed in either one of the first casing or the second casing and which transmits an optical signal; and a light receiving part which is placed in the other one of the first casing or the second casing and which receives an optical signal, and wherein an optical signal transmitted from the light transmitting part is received by the light receiving part by optical space transmission.

In the portable telephone of this embodiment, the optical signal transmission section includes the light transmitting part and the light receiving part, where an optical signal transmitted from the light transmitting part is received by the light receiving part by optical space transmission. Therefore, a portable telephone which needs no signal transmission channel, which is less subject to occurrence of electromagnetic-wave noise and which is compact can be manufactured.

In one embodiment of the invention, with the first casing and the second casing developed, the light transmitting part and the light receiving part are placed so as to be opposed and optically coupled to each other.

In the portable telephone of this embodiment, with the first casing and the second casing developed, the light transmitting part and the light receiving part are placed so as to be opposed and optically coupled to each other. Therefore, when the portable telephone is put into use with the first casing and the second casing developed, optical signals can be transmitted with reliability.

In one embodiment of the invention, with the first casing and the second casing developed, the first casing and the second casing have recess-and-protrusion structures for interrupting disturbance light at their portions corresponding to the light transmitting part and the light receiving part, respectively.

In the portable telephone of this embodiment, with the first casing and the second casing developed, the first casing and the second casing have recess-and-protrusion structures for interrupting disturbance light at their portions corresponding to the light transmitting part and the light receiving part, respectively. Accordingly, there are no influences of disturbance light on the signal transmission between the first casing and the second casing, so that successful communications of optical space transmission can be realized. Thus, a compact portable telephone which is less subject to occurrence of electromagnetic-wave noise can be manufactured.

In one embodiment of the invention, in the first casing and the second casing, boards are provided, respectively, with the first casing and the second casing developed, the board of the first casing and the board of the second casing are inclined to each other at a specified angle, and the light transmitting part is mounted on one of the boards of the first casing and the second casing so that an optical axis of the light transmitting part is inclined at a specified angle to a direction perpendicular to the one board, while the light receiving part is mounted on the other one of the boards of the first casing and the second casing so that an optical axis of the light receiving part is inclined at a specified angle to a direction perpendicular to the other board, and wherein with the first casing and the second casing developed, the optical axis of the light transmitting part and the optical axis of the light receiving part are coincident with each other.

In the portable telephone of this embodiment, with the first casing and the second casing developed, the optical axis of the light transmitting part and the optical axis of the light receiving part are coincident with each other, so that communications of optical space transmission with good transmission efficiency can be realized. Thus, a compact portable telephone which is less subject to occurrence of electromagnetic-wave noise can be manufactured.

In one embodiment of the invention, the light receiving part includes:

a photodiode; and a circuit which is integrated with the photodiode into one chip and which processes a signal of the photodiode.

In this case, the circuit is a preamplifier circuit as an example.

In the portable telephone of this embodiment, the light receiving part includes the photodiode, and a circuit which is integrated with the photodiode into one chip and which processes a signal of the photodiode, so that the light receiving part can be provided as a compact one. Thus, a compact portable telephone which is less subject to occurrence of electromagnetic-wave noise can be manufactured.

In one embodiment of the invention, the optical signal transmission section includes:

optical element parts which are placed in the first casing and the second casing, respectively, and which perform at least one of transmission and reception of optical signals;

an optical transmission medium which is stretched between the first casing and the second casing so as to optically couple the optical element part of the first casing and the optical element part of the second casing to each other and which has plugs provided at its both ends; and receptacles which are placed in the first casing and the second casing, respectively, and which have the plugs of the optical transmission medium fitted and held thereto while having the optical element parts fitted and held thereto so that the optical element parts and the optical transmission medium are optically coupled to each other.

In the portable telephone of this embodiment, the optical signal transmission section includes optical element parts which are placed in the first casing and the second casing, respectively, an optical transmission medium which is stretched between the first casing and the second casing and which has plugs provided at its both ends, and receptacles which are placed in the first casing and the second casing, respectively, and which have the plugs of the optical transmission medium fitted and held thereto while having the optical element parts fitted and held thereto so that the optical element parts and the optical transmission medium are optically coupled to each other. Accordingly, there is no need for providing any optical connection member other than the fitting members of the plugs and the receptacles, so that the parts count can be reduced and the structure can be simplified. Also, since the plugs and the optical element parts are fitted to the receptacles, a size reduction can be achieved, and the optical transmission medium and the optical element parts can be optically coupled together with reliability.

In one embodiment of the invention, the receptacles allow the plugs of the optical transmission medium and the optical element parts to be fitted thereto along a direction perpendicular to an optical axis of the optical transmission medium.

In the portable telephone of this embodiment, since the receptacles allow the plugs of the optical transmission medium and the optical element parts to be fitted thereto along a direction perpendicular to an optical axis of the optical transmission medium, the plugs of the optical transmission medium and the optical element parts can be assembled to the receptacles with ease.

In one embodiment of the invention, the first casing and the second casing are provided with a hinge portion by which the first casing and the second casing are coupled to each other so as to be foldable or developable, and the optical transmission medium is stretched between the first casing and the second casing by passing through inside of the hinge portion.

In the portable telephone of this embodiment, since the optical transmission medium is stretched between the first casing and the second casing by passing through inside of the hinge portion, the optical transmission medium can be concealed inside the hinge portion, so that constraints on movable ranges of the first casing and the second casing are largely reduced. As a result, a portable telephone which allows the first casing and the second casing to be freely developed can be realized. Moreover, since there is no stress applied to the optical transmission medium, high-quality transmission can be carried out.

In one embodiment of the invention, with the plugs of the optical transmission medium and the optical element parts fitted to the receptacles, respectively, one surface of one of the plugs, one surface of one of the optical element parts and one surface of one of the receptacles are placed so as to be substantially flush with one another.

In the portable telephone of this embodiment, with the plugs of the optical transmission medium and the optical element parts fitted to the receptacles, respectively, one surface of one of the plugs, one surface of one of the optical element parts and one surface of one of the receptacles are placed so as to be substantially flush with one another. Therefore, when the plugs and the optical element parts are assembled to the receptacles, respectively, it is necessary that the plug, the optical element part and the receptacle have to be set flush with one another. Thus, it can be easily decided whether or not the optical coupling has securely been fulfilled.

In one embodiment of the invention, each of the optical element parts has a light emitting element and a light receiving element, and the optical transmission medium is provided two in number, where one optical transmission medium optically couples the light emitting element of the first casing and the light receiving element of the second casing to each other while the other optical transmission medium optically couples the light receiving element of the first casing and the light emitting element of the second casing to each other.

In the portable telephone of this embodiment, each of the optical element parts has a light emitting element and a light receiving element, and one optical transmission medium optically couples the light emitting element of the first casing and the light receiving element of the second casing to each other while the other optical transmission medium optically couples the light receiving element of the first casing and the light emitting element of the second casing to each other. Therefore, a compact portable telephone capable of bidirectional communications can be realized.

In one embodiment of the invention, the optical transmission medium is provided at least two in number, each of the optical transmission mediums being provided with the plugs, where adjacent ones of the plugs are coupled to each other by a foldable bending portion.

In the portable telephone of this embodiment, since the adjacent plugs are coupled to each other by a foldable bending portion, the adjacent plugs can be folded at the bending portion, and even with a small inside of the hinge portion, the optical transmission medium can be passed through the inside of the hinge portion while the bending portion is kept folded. In this case, since the inside of the hinge portion can be reduced in size, an even more compact portable telephone can be realized.

In one embodiment of the invention, the optical transmission medium is provided at least two in number, each of the optical transmission mediums being provided with the plugs, where adjacent ones of the plugs have engagement portions, respectively, which are separably engageable with each other.

In the portable telephone of this embodiment, the adjacent plugs have engagement portions, respectively, which are separably engageable with each other. Therefore, when the optical transmission medium is passed through the inside of the hinge portion, the adjacent plugs can be separated from each other, and individually passed through the inside of the hinge portion, and thereafter, the adjacent plugs are engaged and integrated together, by which the plugs can be fitted to the receptacle. Thus, the inside of the hinge portion can be reduced in size, so that an even more compact portable telephone can be realized.

In one embodiment of the invention, the receptacles have through holes into which the optical element parts are to be fitted, respectively.

In the portable telephone of this embodiment, since the optical element parts are fitted to the through holes of the receptacles, respectively, the receptacle and the optical element part can be made generally equal in height to each other. Thus, the receptacles can be made lower in height, and an even more compact portable telephone can be realized.

In one embodiment of the invention, the receptacles and the optical element parts have fixing-use engagement portions, respectively, which are to be engaged with and fixed to each other in a state that the optical element parts are fitted to the receptacles, respectively.

In the portable telephone of this embodiment, the receptacles and the optical element parts have fixing-use engagement portions, respectively, which are to be engaged with and fixed to each other in a state that the optical element parts are fitted to the receptacles, respectively. Therefore, since the optical element parts and the receptacles are securely engaged with and held to each other, the receptacles can be provided as small-size ones, so that a compact portable telephone can be realized. Also, since no additional fixing-use member is needed, a low-cost portable telephone can be realized.

In one embodiment of the invention, the receptacles and the optical element parts have positioning-use engagement portions, respectively, which are to be engaged with and positioned to each other in a state that the optical element parts are fitted to the receptacles, respectively.

In the portable telephone of this embodiment, the receptacles and the optical element parts have positioning-use engagement portions, respectively, which are to be engaged with and positioned to each other in a state that the optical element parts are fitted to the receptacles, respectively. Therefore, positioning of the receptacles and the optical element parts can be securely achieved, so that the receptacles can be provided as small-size, high-transmission-quality ones, and a compact, high-performance portable telephone can be realized. Also, since no additional positioning-use member is needed, a low-cost portable telephone can be realized.

Also, there is provided an electronic equipment comprising:

a first casing having a display panel;

a second casing which has an operation panel and which is coupled to the first casing so as to be foldable or developable; and an optical signal transmission section for performing signal transmission between the first casing and the second casing by optical signals.

In this case, the transmission method of the optical signal transmission section includes the optical space transmission method, in which an optical signal is passed in the air, and the optical fiber transmission method, in which an optical signal is passed through a thin tube of quartz or the like. Also, the electronic equipment is, for example, PDAs, notebook PCs (Personal Computers), portable DVDs (Digital Versatile Discs), digital music equipment or other portable equipment.

In the electronic equipment of this invention, since the optical signal transmission section for performing signal transmission between the first casing and the second casing by optical signals is included, there is no occurrence of electromagnetic-wave noise from the optical signal transmission section, so that electromagnetic-wave noise of the whole electronic equipment can be reduced to an extreme extent. Also, the shield for the optical signal transmission section is no longer necessitated, making it possible to achieve a space saving, so that compact electronic equipment can be realized.

According to the portable telephone of the present invention, since the optical signal transmission section for performing signal transmission between the first casing and the second casing by optical signals is included, a complex electromagnetic shield structure can be omitted, so that a portable telephone which is less subject to occurrence of electromagnetic-wave noise can be realized.

Further, according to the electronic equipment of the invention, since the optical signal transmission section for performing signal transmission between the first casing and the second casing by optical signals is included, a complex electromagnetic shield structure can be omitted, so that electronic equipment which is less subject to occurrence of electromagnetic-wave noise can be realized.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein:

FIG. 16C is a side view of FIG. 16A;

DETAILED DESCRIPTION OF THE INVENTION

Hereinbelow, the present invention will be described in detail by way of embodiments thereof illustrated in the accompanying drawings.

First Embodiment

Figure 1A:
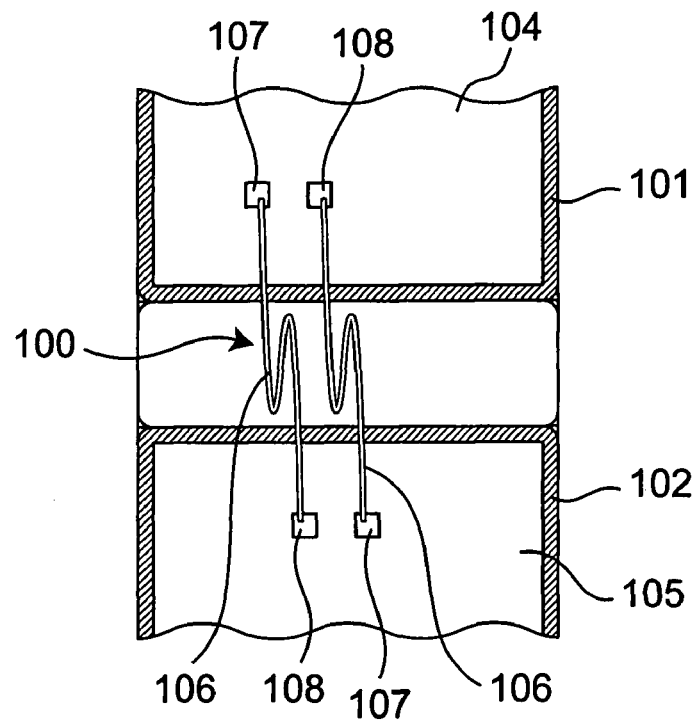
FIG. 1A is a front sectional view showing a first embodiment of a portable telephone according to the present invention.
Figure 1B:
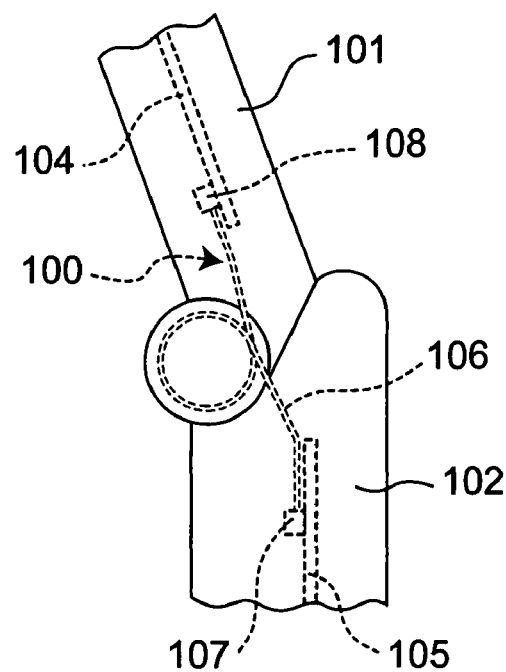
FIG. 1B is a side view of the portable telephone of the first embodiment.
Figure 17:
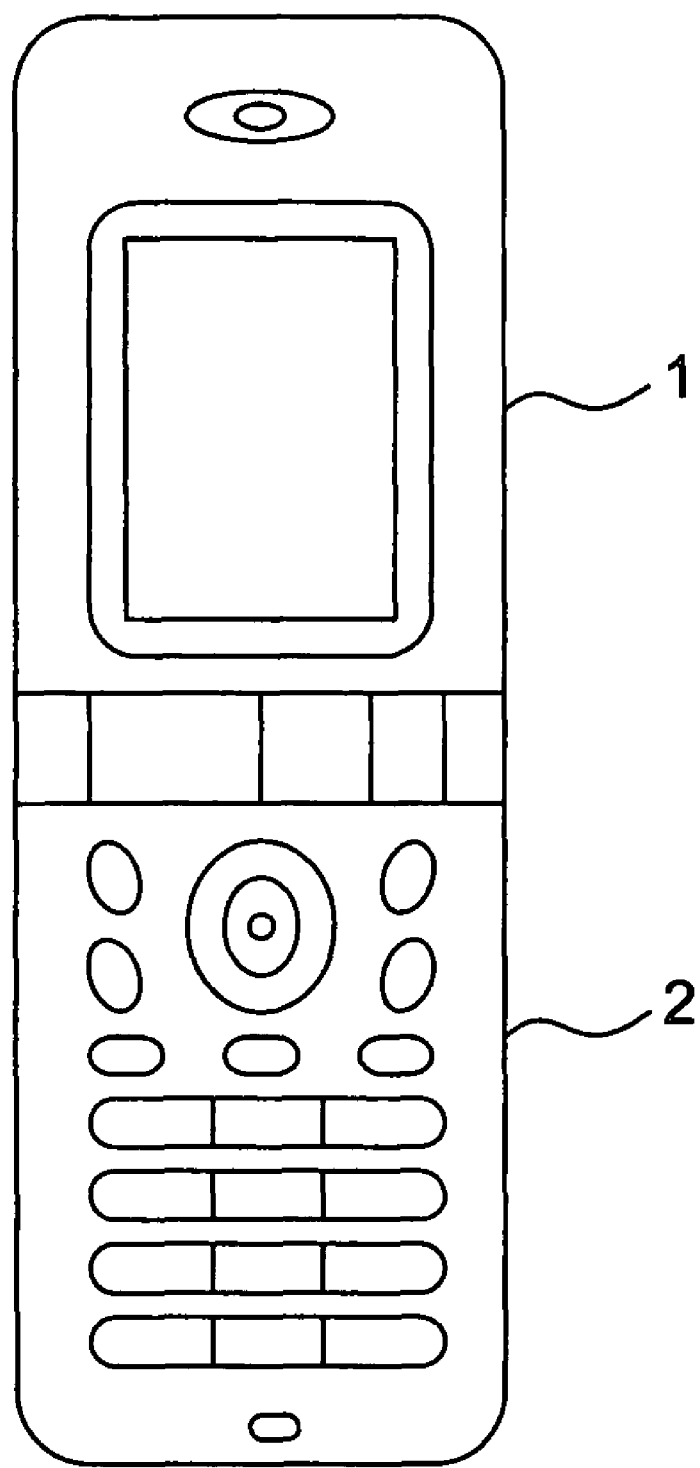
FIG. 17 is a front view of a conventional portable telephone.
Figure 18A:
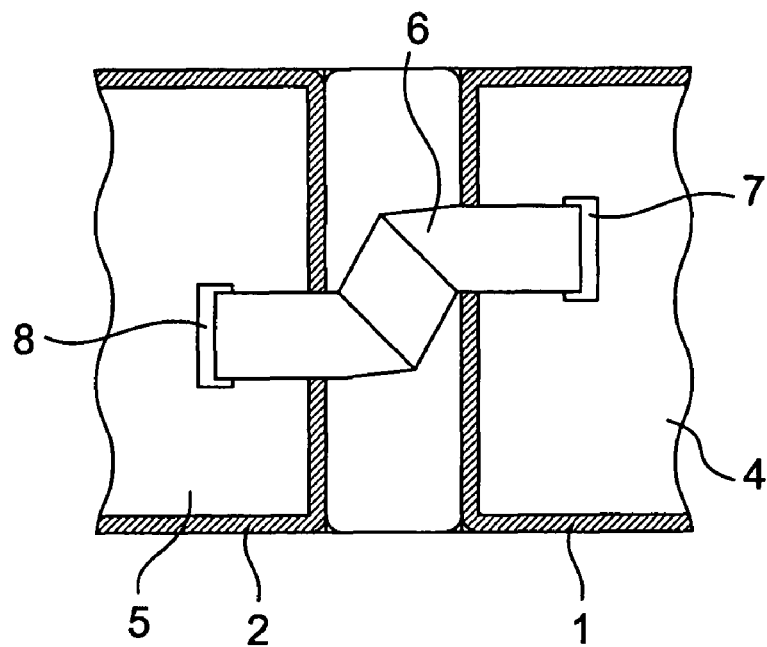
FIG. 18A is a front sectional view of the conventional portable telephone.
Figure 18B:
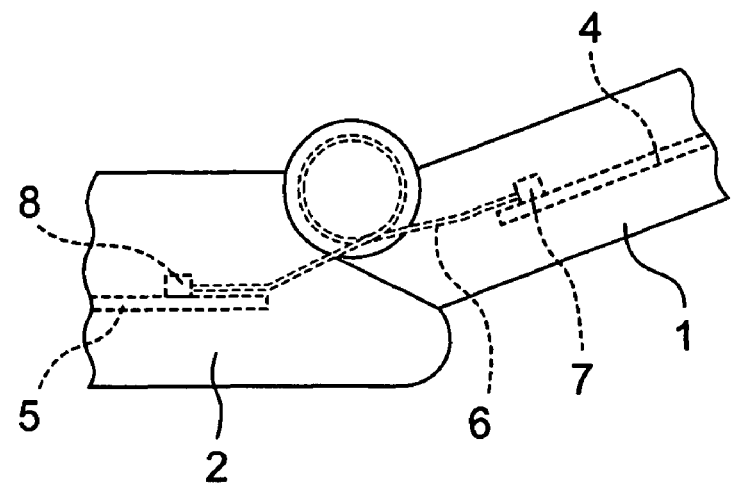
FIG. 18B is a side view of the conventional portable telephone.
Figure 19:
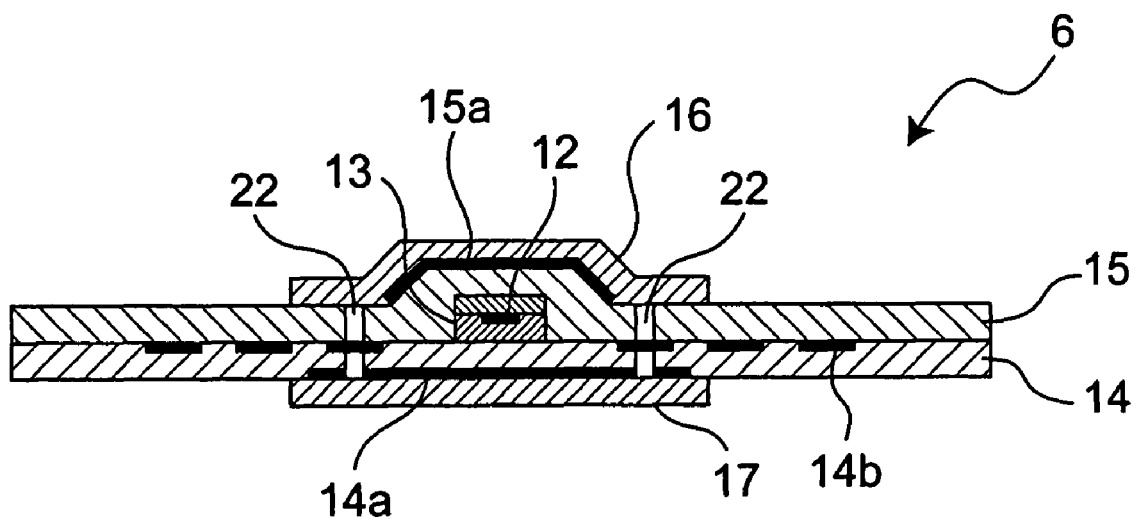
FIG. 19 is a cross-sectional view of a coaxial type flexible cable.

FIGS. 1A and 1B show simplified structural views of a first embodiment of the portable telephone of the invention. FIG. 1A is a front sectional view of the portable telephone, and FIG. 1B is a side view of the portable telephone. FIGS. 1A and 1B each show a developed state of the portable telephone as in FIG. 17.

This portable telephone has a first casing 101, a second casing 102, and an optical signal transmission section 100 for performing signal transmission between the first casing 101 and the second casing 102 by optical signals.

The first casing 101 has a display panel such as a screen. The second casing 102 has an operation panel such as buttons.

The first casing 101 and the second casing 102 are coupled to each other so as to be freely foldable or developable. That is, the coupling portion between the first casing 101 and the second casing 102 forms a hinge.

The optical signal transmission section 100 includes a light transmitting part 107 for transmitting an optical signal, a light receiving part 108 for receiving an optical signal, and a flexible cable 106 serving as an optical transmission medium for optically coupling the light transmitting part 107 and the light receiving part 108 together.

The light transmitting part 107 and the light receiving part 108 are set in the first casing 101 and the second casing 102, respectively. That is, inside the first casing 101 and the second casing 102 are boards 104, 105, respectively, on which circuits are provided, and the light transmitting part 107 and the light receiving part 108 are attached to boards 104, 105, respectively.

In addition, it is required only that the light transmitting part 107 is set in either one of the first casing 101 or the second casing 102 while the light receiving part 108 is set in the other one of the first casing 101 or the second casing 102.

The flexible cable 106 is provided two in number so as to be stretched between the first casing 101 and the second casing 102. The flexible cables 106 are wound around a pivotal coupling axis between the first casing 101 and the second casing 102.

One of the flexible cables 106 couples together the light transmitting part 107, which is included in the first casing 101, and the light receiving part 108, which is included in the second casing 102. The other of the flexible cables 106 couples together the light receiving part 108, which is included in the first casing 101, and the light transmitting part 107, which is included in the second casing 102.

Then, an optical signal transmitted from the light transmitting part 107 is received by the light receiving part 108 via the flexible cables 106. That is, this portable telephone is enabled to perform signal transmission bidirectionally between the first casing 101 and the second casing 102.

In this portable telephone constructed as shown above, which includes the optical signal transmission section 100 that performs the signal transmission between the first casing 101 and the second casing 102 with optical signals, there occurs no electromagnetic-wave noise from the optical signal transmission section 100, so that electromagnetic-wave noise of the whole portable telephone can be reduced to an extreme extent. Also, the shield for the optical signal transmission section 100 is no longer necessitated, making it possible to achieve a space saving, which is suited for internal connections of a compact portable telephone.

The transmission speed of the optical signal transmission section 100 may be 400 Mbps or more, where even a high-speed signal is transmitted, there occurs no electromagnetic-wave noise from the optical signal transmission section 100, which is preferable for high-speed signal transmission. Thus, there can be achieved a portable telephone which is quite less subject to occurrence of electromagnetic-wave noise even in optical transmission of high-speed signals of dynamic images or the like.

Also, in the optical signal transmission section 100, which has the light transmitting part 107, the light receiving part 108 and the flexible cables 106, an optical signal transmitted from the light transmitting part 107 is received by the light receiving part 108 via the flexible cables 106. Thus, the signal can be transmitted with high reliability by the flexible cables 106.

Figure 2A:
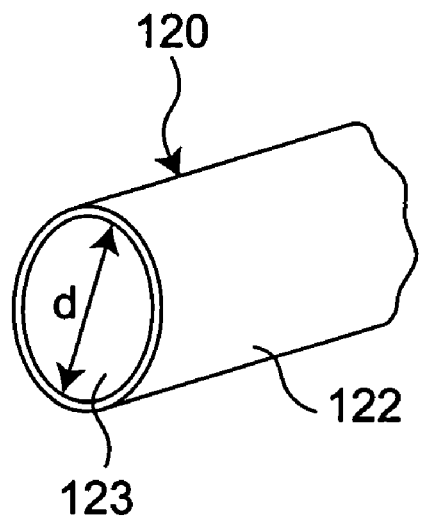
FIG. 2A is a perspective view showing a single-core plastic optical fiber cable.

As the flexible cables 106, a single-core plastic optical fiber cable 120 may also be used as shown in FIG. 2A. This single-core plastic fiber cable 120 has a single-core plastic fiber 123 having a diameter of 0.5 mm or less, and a cover tube 122 which covers the single-core plastic fiber 123.

Accordingly, it becomes possible to fulfill high-speed optical fiber transmission, and the signal cables can be mounted in a smaller number with high flexibility. Thus, a compact portable telephone which is low in cost and less subject to occurrence of electromagnetic-wave noise can be manufactured. Moreover, when one optical fiber cable is used to perform one-core full duplex communications, it also becomes possible to perform bidirectional transmission with one optical fiber cable.

Figure 2B:
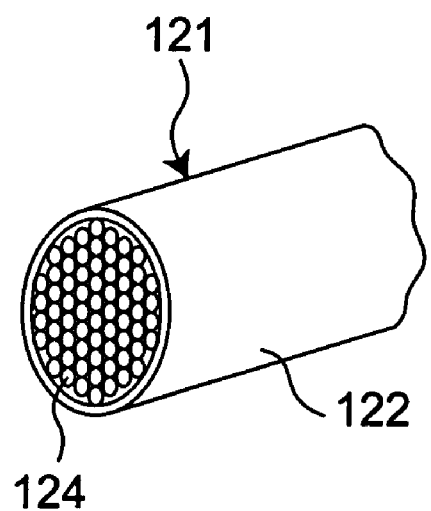
FIG. 2B is a perspective view showing a multi-core plastic optical fiber cable.

The flexible cables 106 may also be given by using a multi-core type plastic optical fiber cable 121 as shown in FIG. 2B. This multi-core type plastic optical fiber cable 121 has a multi-core type plastic fiber 124, and a cover tube 122 which covers this multi-core type plastic fiber 124.

Accordingly, it becomes possible to fulfill high-speed optical fiber transmission, so that the signal cables can be mounted in a smaller number with even higher flexibility. Thus, a compact portable telephone which is less subject to occurrence of electromagnetic-wave noise can be manufactured.

In addition, a multi-core type glass fiber cable may also be used as the flexible cables 106. Accordingly, it becomes possible to fulfill even higher-speed optical fiber transmission, so that the signal cables can be mounted in a smaller number with even higher flexibility. Thus, a compact portable telephone which is less subject to occurrence of electromagnetic-wave noise can be manufactured.

As the light transmitting part 107, an LED having an emission wavelength of 650±50 nm may be used. Accordingly, optical signal transmission of high optical transmission efficiency can be carried out, and the electromagnetic shield structure is not necessary, as compared with conventional flexible cables for electric signals. Thus, a compact portable telephone which is low in cost can be manufactured. That is, in the case where the plastic optical fiber cable 120, 121 or the glass fiber cable is used as the flexible cables 106, optical signals within an emission wavelength range of 650±50 nm are subject to less attenuation, so that optical signal transmission with good optical transmission efficiency can be achieved.

In addition, PCS (Polymer Clad Silica) fiber cable may be used as the flexible cables 106, where it becomes possible to fulfill even higher-speed optical fiber transmission with relatively low cost, so that the signal cables can be mounted in a smaller number with even higher flexibility. Thus, a compact portable telephone which is less subject to occurrence of electromagnetic-wave noise can be manufactured.

In this case, a VCSEL (Vertical Cavity Surface Emitting Laser), which is a plane emission laser having an emission wavelength of 600 to 900 nm, may also be used as the light transmitting part 107, where optical signal transmission with good optical transmission efficiency can be carried out, and the electromagnetic shield structure is not necessary, as compared with conventional flexible cables for electric signals. Thus, a low-cost, compact portable telephone can be manufactured. That is, in the case where the PCS fiber cable is used as the flexible cables 106, optical signals within an emission wavelength range of 600 to 900 nm are less subject to attenuations, so that optical signal transmission with good optical transmission efficiency can be performed.

Second Embodiment

Figure 3A:
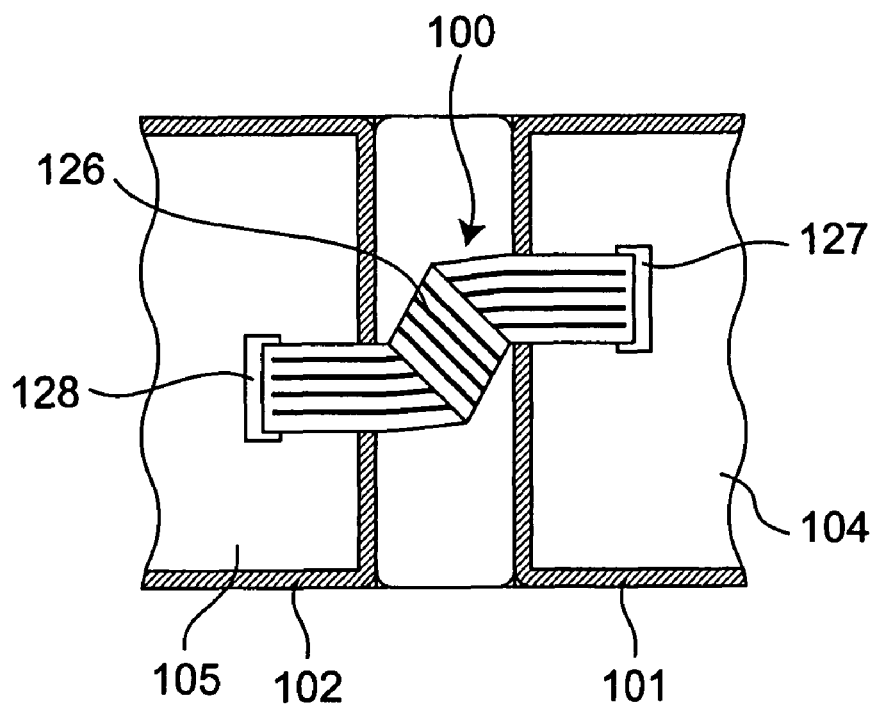
FIG. 3A is a front sectional view showing a second embodiment of a portable telephone according to the present invention.
Figure 3B:
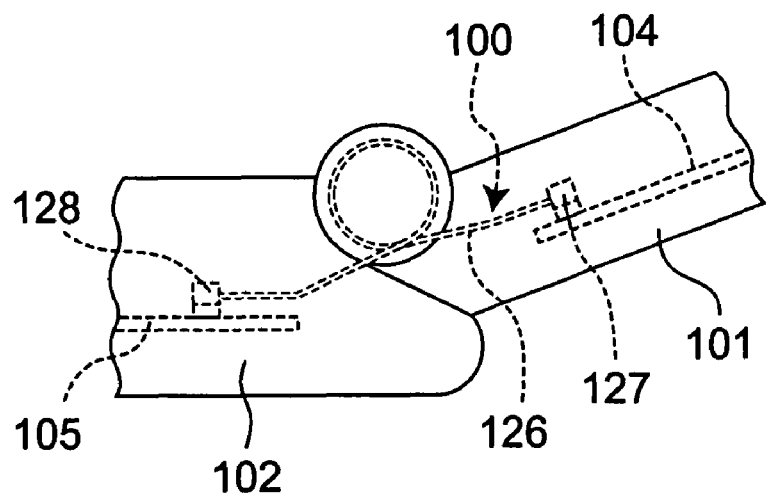
FIG. 3B is a side view of the portable telephone of the second embodiment.

FIGS. 3A and 3B show a second embodiment of the portable telephone of the invention. This embodiment differs from the first embodiment in that a flexible-board type waveguide is used as the optical transmission medium in the second embodiment.

More specifically, in this second embodiment, the optical signal transmission section 100 includes a light transmitting part 127 mounted on the board 104 of the first casing 101, a light receiving part 128 mounted on the board 105 of the second casing 102, and a flexible-board type waveguide 126 for coupling together the light transmitting part 127 and the light receiving part 128. The flexible-board type waveguide 126 is formed from, e.g., polymer plastic or glass. Then, the light transmitting part 127 transmits an optical signal to the light receiving part 128 via the flexible-board type waveguide 126.

Accordingly, with the flexible-board type waveguide 126, the electromagnetic shield structure is not necessary, as compared with conventional flexible cables for electric signals. Also, one flexible-board type waveguide 126 makes it possible to perform concurrent multi-channel transmission as well as higher-speed transmission, so that a low-cost, compact portable telephone can be manufactured.

As the light transmitting part 127, an LED array having an emission wavelength range of 650±50 nm may also be used. In this case, the light transmitting part 127 can be further compacted, and a portable telephone which is less subject to occurrence of electromagnetic-wave noise, which is compact, and which is capable of higher-speed signal transmission can be manufactured. That is, by virtue of the use of an emission wavelength range in which optical signals are less subject to attenuations against the flexible-board type waveguide 126 formed from polymer plastic, and by making the pitch of the waveguide 126 and the pitch of the LED array coincident with each other, it becomes possible to make the light transmitting part 127 more compact.

Further, a VCSEL array having an emission wavelength range of 600 to 900 nm may also be used as the light transmitting part 127. In this case, the light transmitting part 127 can be provided as a higher-speed, more compact one, so that a portable telephone which is less subject to occurrence of electromagnetic-wave noise, which is compact and which is capable of higher-speed signal transmission can be manufactured. That is, by virtue of the use of an emission wavelength range in which optical signals are less subject to attenuations against the waveguide 126 formed from glass, and by making the pitch of the waveguide 126 and the pitch of the VCSEL array coincident with each other, it becomes possible to make the light transmitting part 127 more compact.

Further, a photodiode array may also be used as the light receiving part 128. In this case, the light receiving part 128 can be provided as a compact one, so that a portable telephone which is less subject to occurrence of electromagnetic-wave noise, which is compact and which is capable of higher-speed signal transmission can be manufactured. That is, by making the pitch of the waveguide 126 and the pitch of the photodiode array coincident with each other, it becomes possible to make the light receiving part 128 more compact.

Third Embodiment

Figure 4A:
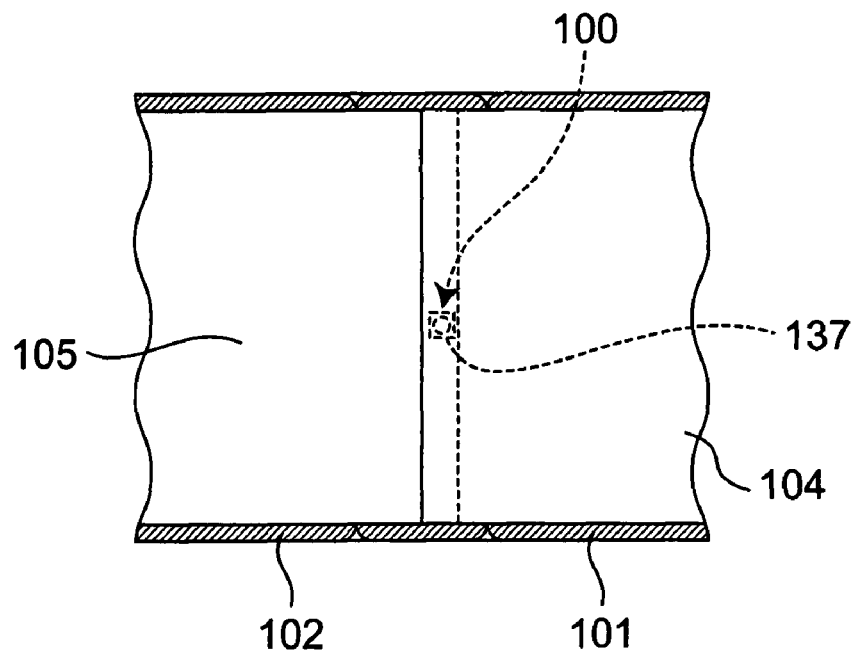
FIG. 4A is a front sectional view showing a third embodiment of a portable telephone according to the present invention.
Figure 4B:
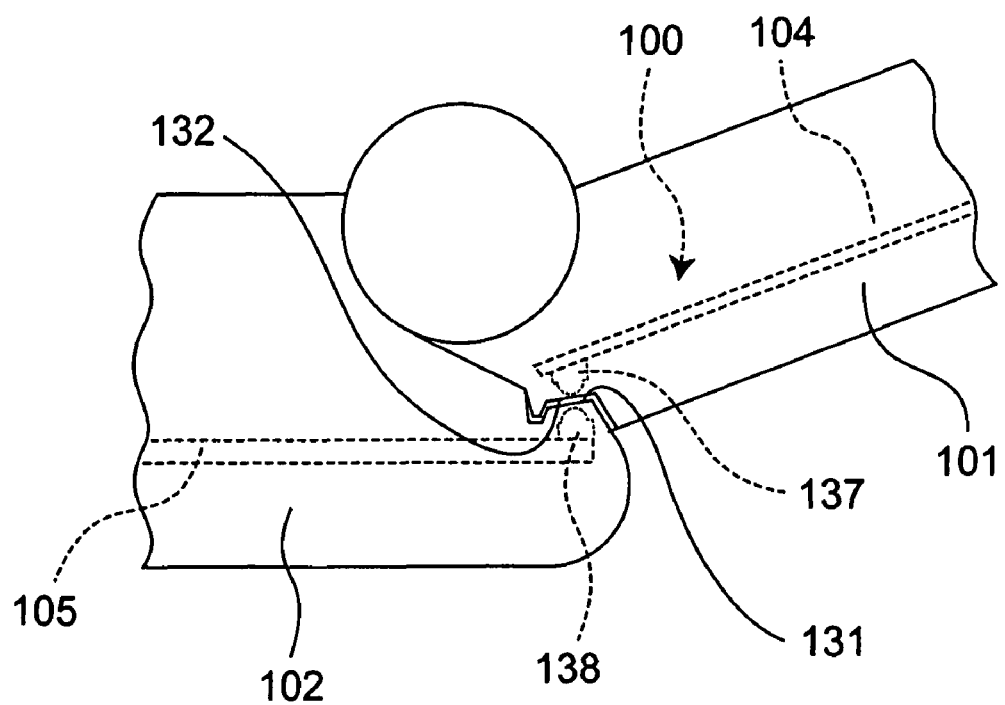
FIG. 4B is a side view of the portable telephone of the third embodiment.

FIGS. 4A and 4B show a third embodiment of the portable telephone of the invention. This embodiment differs from the first embodiment in that the optical signal transmission section is not of the optical fiber transmission method but of the optical space transmission method in the third embodiment.

More specifically, the optical signal transmission section 100 includes a light transmitting part 137 placed on the board 104 of the first casing 101 and serving for transmitting an optical signal, and a light receiving part 138 placed on the board 105 of the second casing 102 and serving for receiving an optical signal, where an optical signal transmitted from the light transmitting part 137 is received through optical space transmission by the light receiving part 138.

Accordingly, the optical space transmission eliminates the need for any signal transmission channel, so that a portable telephone which needs no signal transmission channel, which is less subject to occurrence of electromagnetic-wave noise and which is compact can be manufactured.

Further, it is also possible that the light transmitting part 137 is placed in the second casing 102 while the light receiving part 138 is placed in the first casing 101 so that an optical signal is transmitted from the second casing 102 to the first casing 101. It is still also possible that the light transmitting part 137 and the light receiving part 138 are placed in each of the first casing 101 and the second casing 102, so that optical signals are transmitted bidirectionally between the first casing 101 and the second casing 102.

In a state that the first casing 101 and the second casing 102 have been developed, the light transmitting part 137 and the light receiving part 138 are so placed as to be optically coupled to each other in opposition to each other. Accordingly, when the portable telephone is used with the first casing 101 and the second casing 102 developed, optical signals can be transmitted with high reliability.

In the state that the first casing 101 and the second casing 102 have been developed, the first casing 101 and the second casing 102 have a recess-and-protrusion structure which is placed at portions corresponding to the light transmitting part 137 and the light receiving part 138 and which interrupts disturbance light.

In more detail, the first casing 101 has a recessed portion 132 at a portion corresponding to the light transmitting part 137, while the second casing 102 has a protruding portion 131 at a portion corresponding to the light receiving part 138. In a state that the first casing 101 and the second casing 102 are opened, the recessed portion 132 and the protruding portion 131 overlap with each other.

Accordingly, when the first casing 101 and the second casing 102 are opened for use of the portable telephone, there are no influences of disturbance light on the transmission of signals between the first casing 101 and the second casing 102, so that successful communications of optical space transmission can be realized. That is, a compact portable telephone which is less subject to occurrence of electromagnetic-wave noise can be manufactured. In addition, it is also possible that the protruding portion is provided in the first casing 101 while the recessed portion is provided in the second casing 102.

Figure 5A:
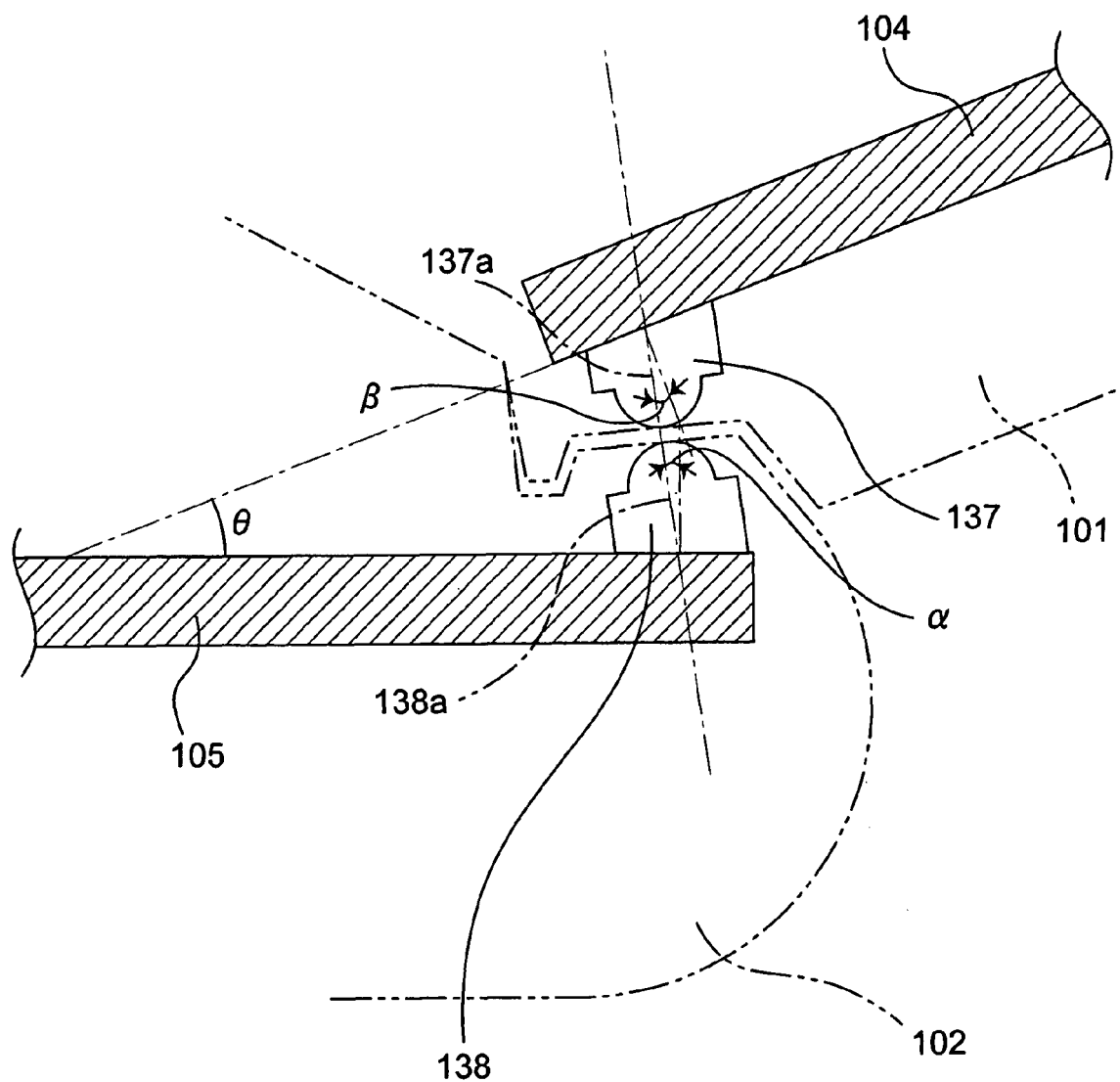
FIG. 5A is an enlarged side view of main part of a portable telephone according to the third embodiment.

With the first casing 101 and the second casing 102 developed as shown in FIG. 5A, the board 104 of the first casing 101 and the board 105 of the second casing 102 are inclined to each other by a specified angle θ.

Figure 5B:
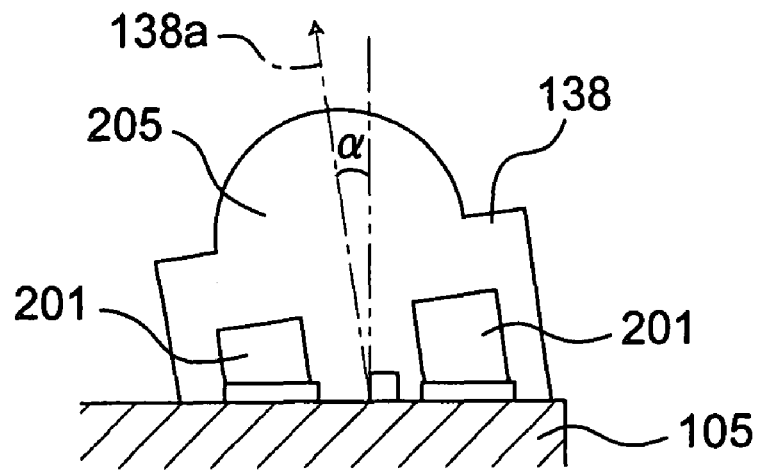
FIG. 5B is an enlarged side view of a light receiving part.
Figure 5C:
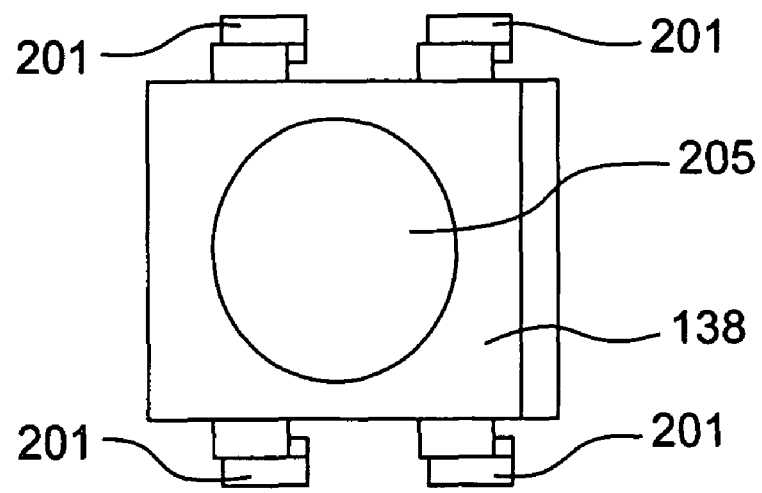
FIG. 5C is an enlarged plan view of the light receiving part.

As shown in FIGS. 5B and 5C, the light receiving part 138 is mounted on the board 105 of the second casing 102 so that an optical axis 138a of the light receiving part 138 is inclined by a specified angle α with respect to a direction perpendicular to the board 105.

The light receiving part 138 and the board 105 are connected to each other by lead terminals 201. These lead terminals 201 are so shaped as to correspond to the specified angle α. In an upper portion of the light receiving part 138, a lens 205 is formed to define a directional angle.

As shown in FIG. 5A, the light transmitting part 137, like the light receiving part 138, is mounted on the board 104 of the first casing 101 so that an optical axis 137a of the light transmitting part 137 is inclined by a specified angle β with respect to a direction perpendicular to the board 104.

Then, with the first casing 101 and the second casing 102 developed, the optical axis 137a of the light transmitting part 137 and the optical axis 138a of the light receiving part 138 are coincident with each other. That is, the specified angle θ equals a value resulting from adding up the specified angle α and the specified angle β.

Accordingly, communications of optical space transmission with good transmission efficiency can be realized. That is, a compact portable telephone which is less subject to occurrence of electromagnetic-wave noise can be manufactured.

Fourth Embodiment

In a fourth embodiment of the portable telephone of the invention, although not shown, a light receiving part having a photodiode and a circuit for processing signals of the photodiode is used as the light receiving parts 108, 128, 138 of the foregoing first to third embodiments. In this light receiving part, the photodiode and the circuit are integrated into one chip. This circuit is, for example, a preamplifier circuit.

If the photodiode alone is housed in a transparent device package, it would be required to extract signals of quite high impedance from the package, hence larger effects of external noise. In addition, housing even the final-stage comparator in the package would cause output signals of the final stage to affect the input stage of the preamplifier, resulting in poorer response characteristics. Therefore, the circuit only is integrated with the photodiode into one chip.

Thus, the light receiving part can be provided as a more compact one, so that a compact portable telephone which is less subject to occurrence of electromagnetic-wave noise can be manufactured.

Fifth Embodiment

Figure 6A:
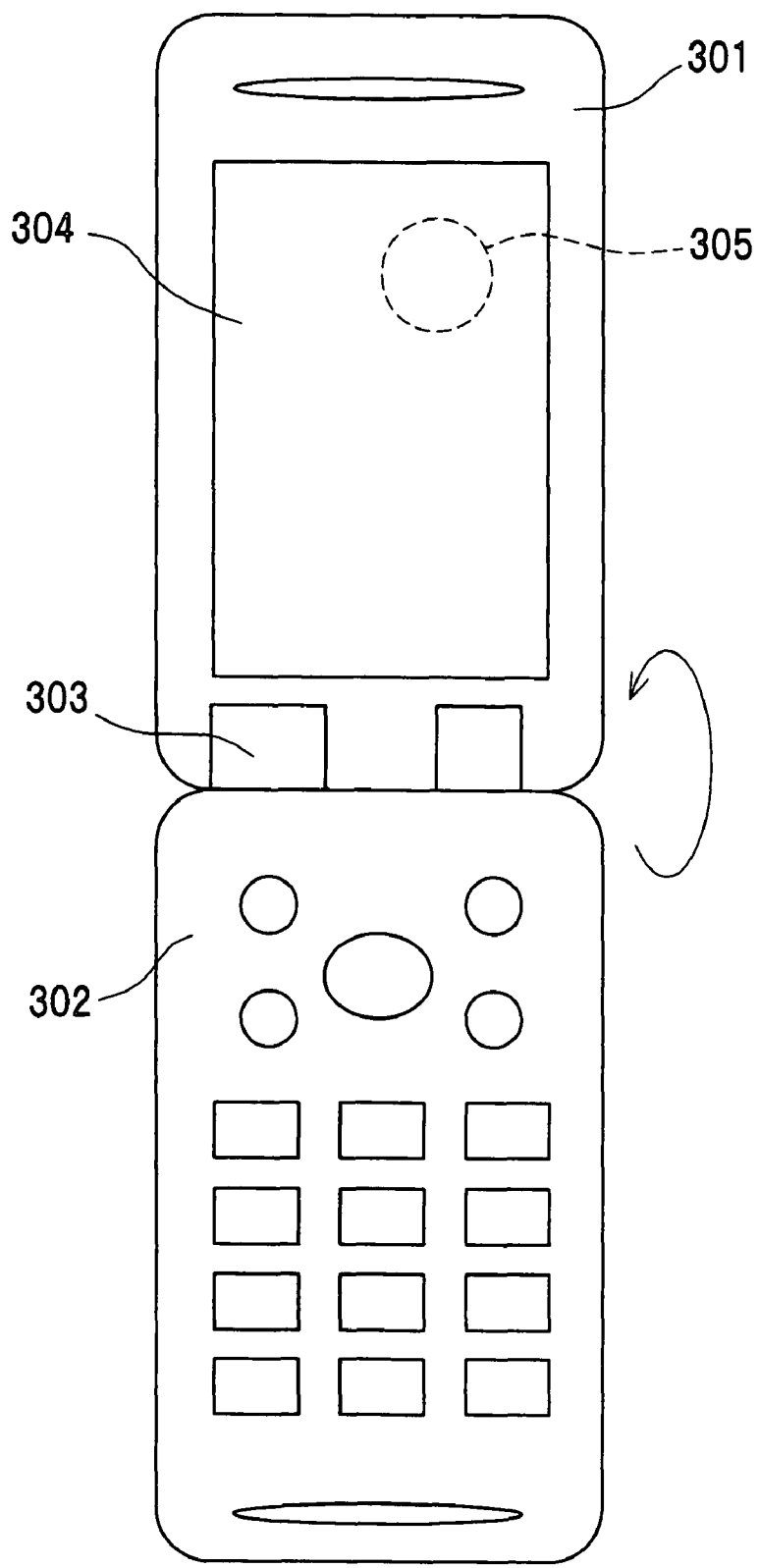
FIG. 6A is a front view showing a fifth embodiment of a portable telephone according to the present invention.
Figure 6B:
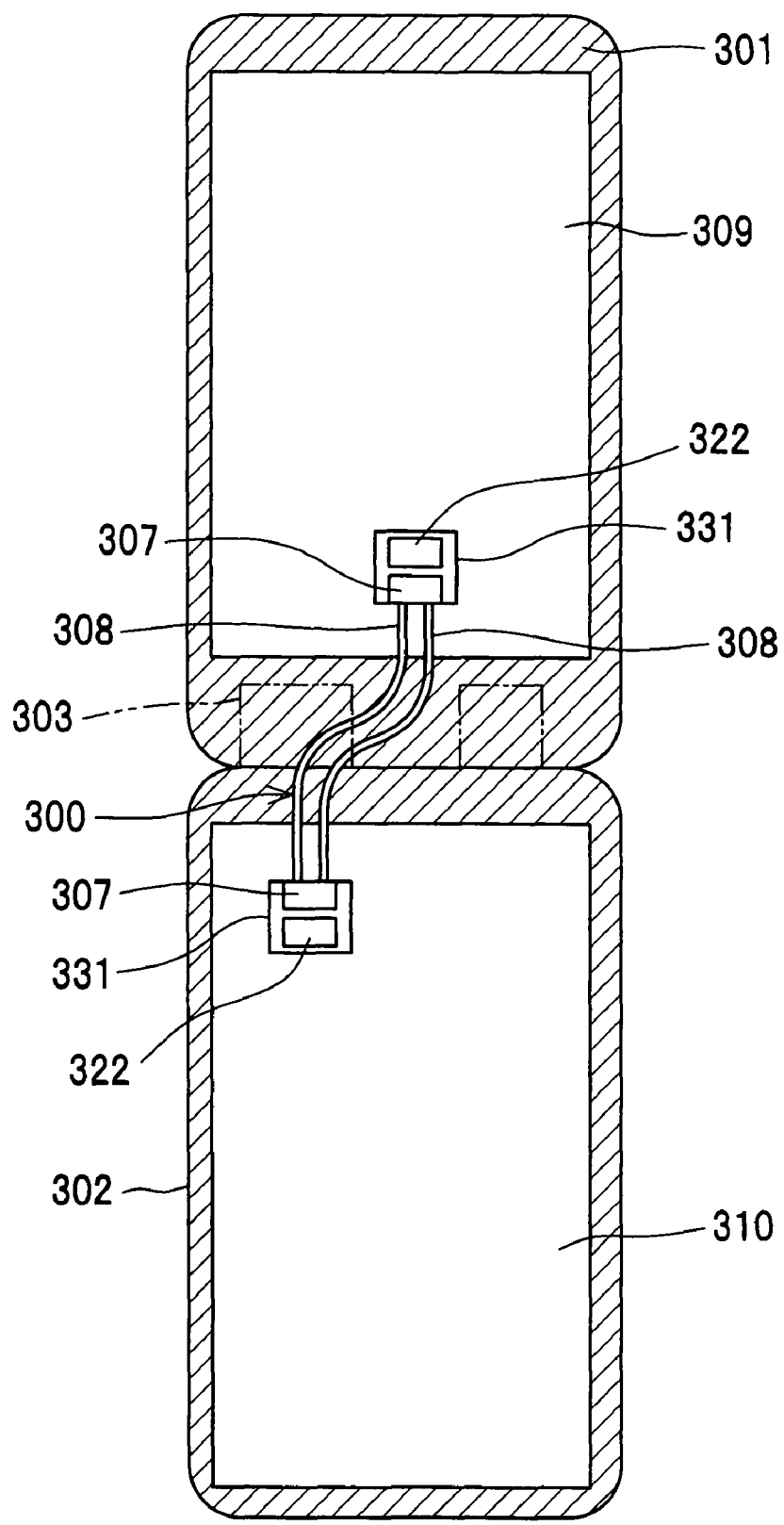
FIG. 6B is a front sectional view of FIG. 6A.
Figure 6C:
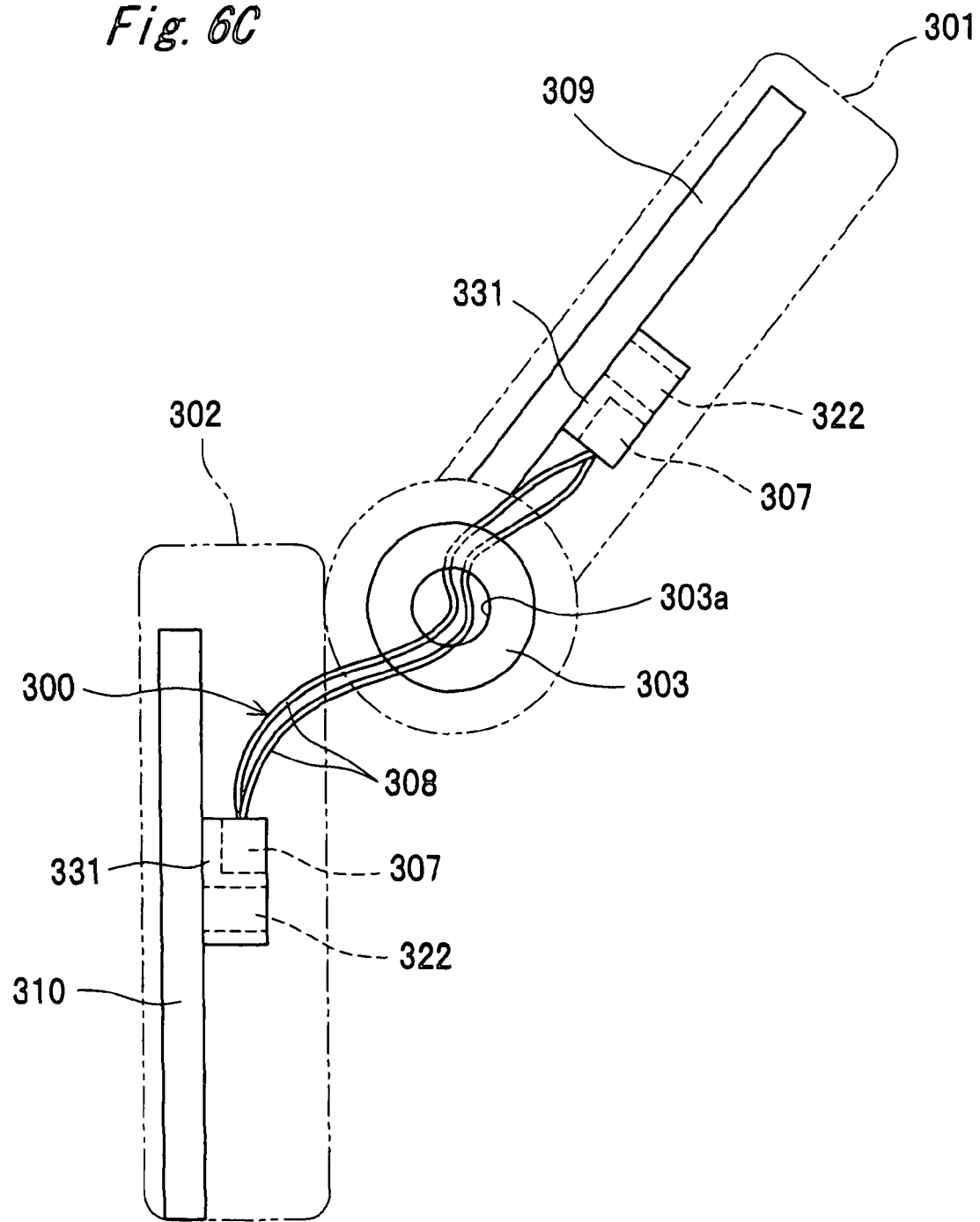
FIG. 6C is a side view of FIG. 6A.

FIGS. 6A, 6B and 6C show a fifth embodiment of the portable telephone of the invention. This portable telephone has a first casing 301 and a second casing 302. For the first casing 301 and the second casing 302, a hinge portion 303 is provided to couple the first casing 301 and the second casing 302 to each other in such a manner that those casings are foldable and developable.

The first casing 301 has a display section 304 placed therein. In the first casing 301, a camera 305 is provided on a rear face of the display section 304. The display section 304 and the camera 305 may be provided in a plural quantity. The camera 305 may be provided also on the face on which the display section 304 is present. The second casing 302 has an operation panel such as buttons or the like.

A board 309 is provided inside the first casing 301, and a board 310 is provided inside the second casing 302. Signal transmission of the board 309 and the board 310 is performed by an optical signal transmission section 300.

The optical signal transmission section 300 includes optical element parts 322 placed in the first casing 301 and the second casing 302, respectively, optical fiber cables 308 as an optical transmission medium which is stretched between the first casing 301 and the second casing 302 so that the optical element part 322 of the first casing 301 and the optical element part 322 of the second casing 302 are optically coupled together, and receptacles 331 which are placed in the first casing 301 and the second casing 302, respectively, and which optically couple together the optical element parts 322 and the optical fiber cables 308.

The optical element parts 322 perform at least either one of transmission or reception of optical signals. In more detail, the optical element parts 322 are packages in which a light emitting element and a light receiving element are sealed by resin, and which are electrically connected to the boards 309, 310, respectively.

Plugs 307 are provided at both ends of the optical fiber cables 308. The receptacles 331 hold the optical element parts 322 fitted thereto as well as the plugs 307 of the optical fiber cables 308 fitted thereto.

As the optical fiber cables 308, a single-core plastic optical fiber is used. The optical fiber cables 308 are provided two in number, and these two optical fiber cables 308 are fixed integrally by the plugs 307.

One of the optical fiber cables 308 optically couples together the light emitting element of the first casing 301 and the light receiving element of the second casing 302, while the other of the optical fiber cables 308 optically couples together the light receiving element of the first casing 301 and the light emitting element of the second casing 302. That is, by the two optical fiber cables 308, bidirectional communications between the boards 309, 310 are performed.

In a case where only unidirectional communications are required, optical signal transmission may be carried out by providing one optical fiber cable 308, providing this one optical fiber cable 308 with the plug 307, providing the first casing 301 with the optical element part 322 having either one of a light emitting element or a light receiving element, and by providing the second casing 302 with the optical element part 322 having the other one of a light emitting element or a light receiving element, where connections are fulfilled by the one optical fiber cable 308 to perform optical signal transmission.

The way how the portable telephone is assembled is now explained below.

The optical element parts 322 are electrically connected to the board 309 and the board 310, respectively. The optical element parts 322 are held in their fitted state by the receptacles 331. The board 309 on one side is fixed to the first casing 301. The board 310 on the other hand is fixed to the second casing 302.

Then, the optical fiber cables 308 on one side are attached, via the plug 307 provided on the one side, to the receptacle 331 of either the first casing 301 or the second casing 302.

Subsequently, the optical fiber cables 308 on the other side, after passed through the inside of the hinge portion 303, are attached, via the plug 307 on the other side, to the receptacle 331 on the other of the first casing 301 or the second casing 302.

It is noted here that the optical fiber cables 308 including the plugs 307 are so sized as to be allowed to pass through the inside of the hinge portion 303.

Figure 7A:
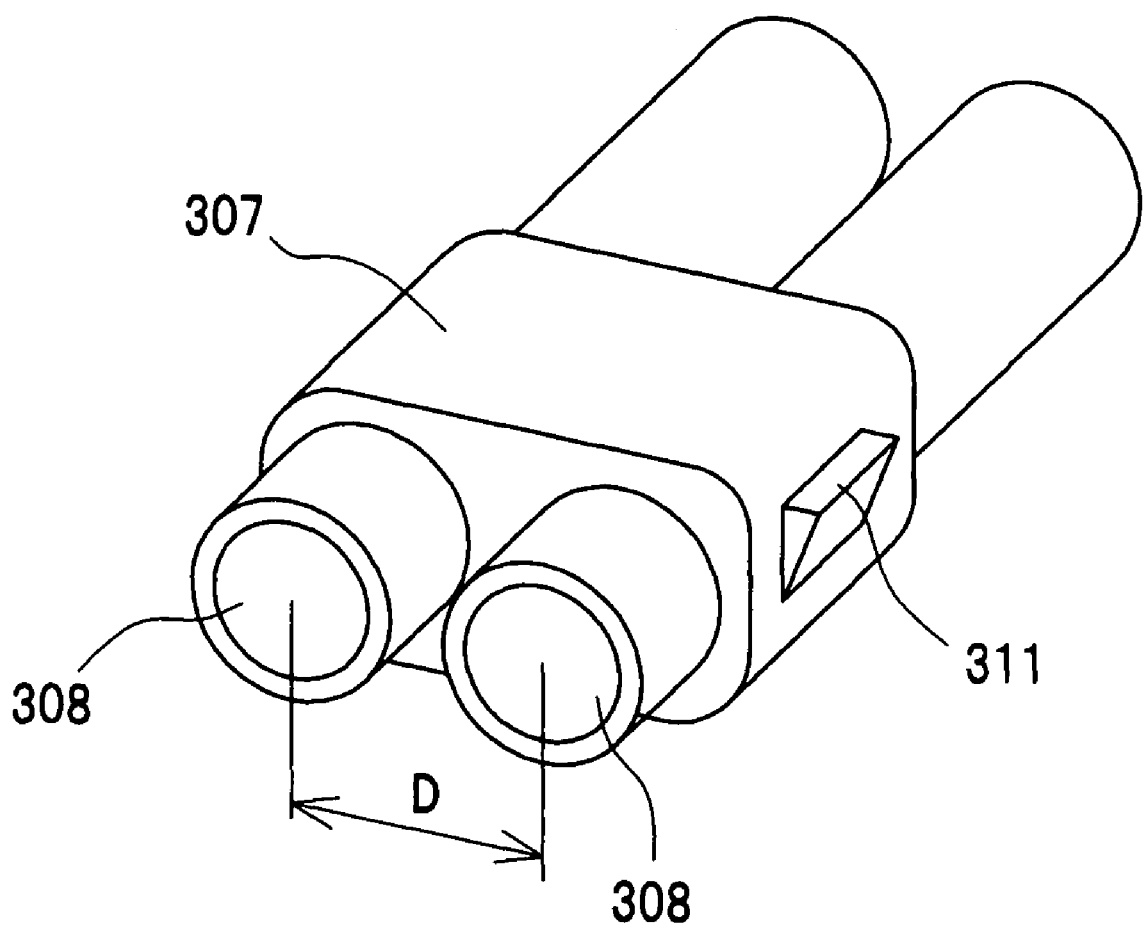
FIG. 7A is a perspective view showing an optical fiber cable and a plug.
Figure 7B:
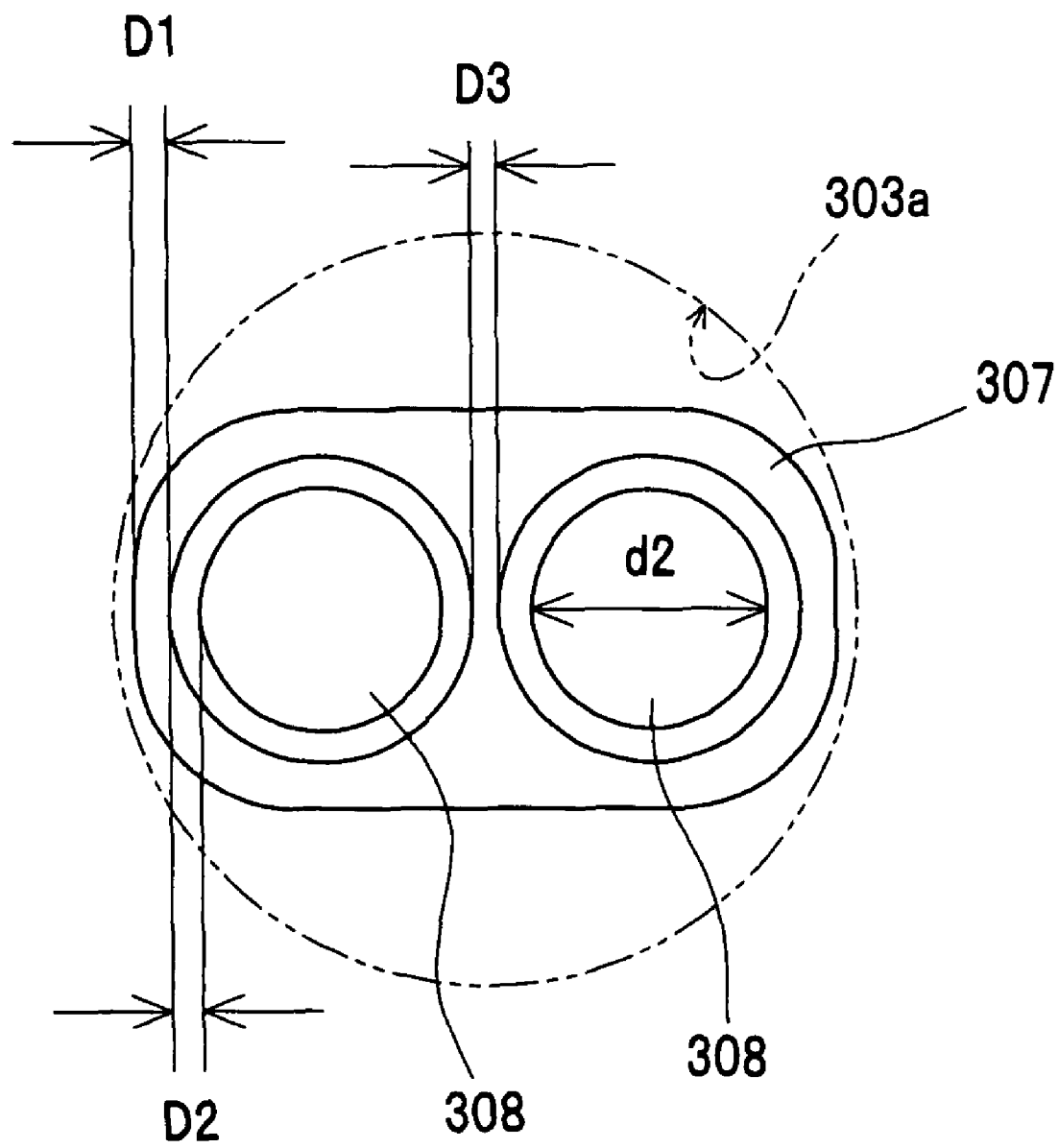
FIG. 7B is a front view of FIG. 7A.

As shown in FIGS. 7A and 7B, the two optical fiber cables 308 are fixed to the plugs 307 that are molded by integral molding. It is noted that the optical fibers 308 and the plugs 307 may also be fixed by using a fixing member such as adhesive or wedge.

The plug 307 has a protruding portion 311 provided for its fitting and holding to a recessed portion formed in the receptacle 331. It is also possible that a recessed portion is provided in the plug 307 while a protruding portion is provided in the receptacle 331. Further, the plug 307 may be fixed to the receptacle 331 by using adhesive.

In this embodiment, when an internal space 303a of the hinge portion 303 (shown by imaginary line) has a diameter of 3 mm, an interval D of the two optical fiber cables 308 is set to 1.5 mm or less for connection to the receptacles 331 through the internal space of the hinge portion 303.

Sizes are explained more specifically. It is assumed that a diameter d2 of the or each optical fiber cable 308 having a coating membrane is 0.7 mm, a wall thickness D2 of a resin that holds the external surface of the optical fiber cable 308 is 0.2 mm, a minimum wall thickness D1 of the or each plug 307 is 0.2 mm, and a wall thickness of a spacing D3 of the resins that hold two optical fiber cables 308 is 0.2 mm. Then, it follows that $D1+D2+d2+D2+D3+D2+d2+D2+D1=2.8$ mm, where the plug 307 is externally sized to be 2.8 mm. Thus, even if the diameter of the internal space of the hinge portion 303 is 3 mm, the optical fiber cables 308 are allowed to pass through the inside of the hinge portion 303.

Figure 8A:
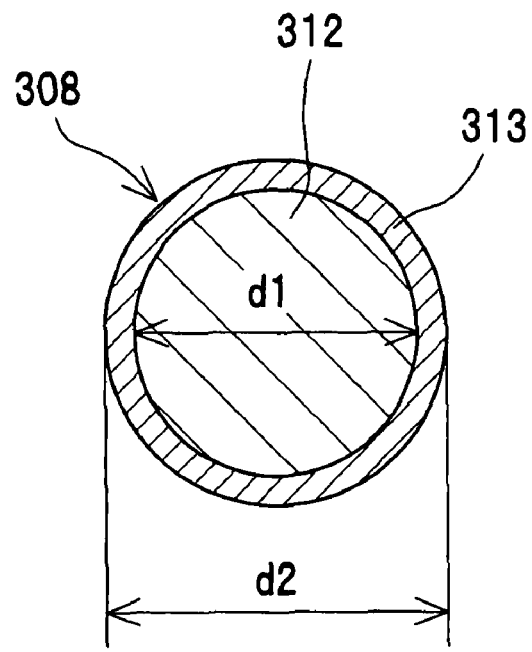
FIG. 8A is a sectional view showing a single-core plastic optical fiber cable.

As shown in FIG. 8A, single-core optical fiber cables are used as the optical fiber cables 308, and each of the optical fiber cable 308 has a single core 312, and a cover membrane 313 that covers the single core 312. The diameter d1 of the single core 312 is 0.5 mm or less, and the diameter d2 of the optical fiber cable 308 is 0.7 mm or less.

Figure 8B:
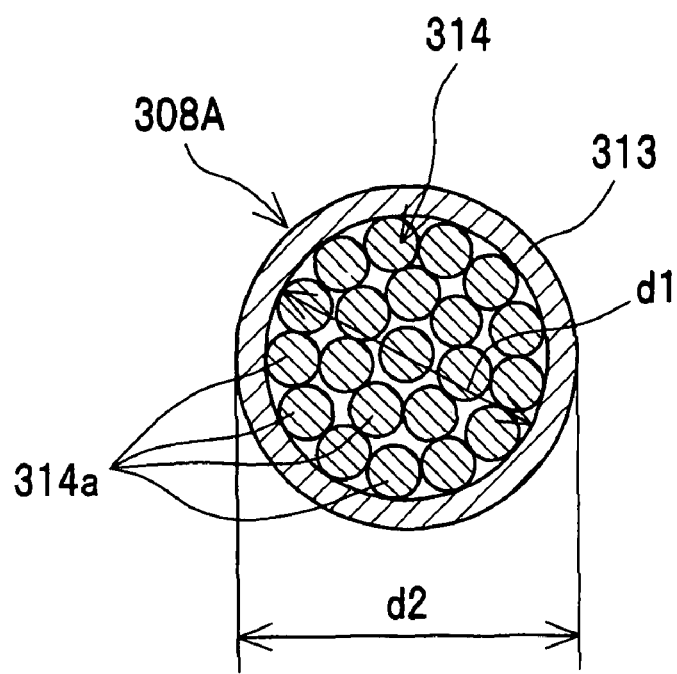
FIG. 8B is a sectional view a multi-core plastic optical fiber cable.

In addition, as shown in FIG. 8B, a multi-core optical fiber cable may also be used as the optical fiber cables. This optical fiber cable 308A has a multiple core 314, and a cover membrane 313 which covers the multiple core 314. The multiple core 314 is a set of a plurality of cores 314a. Then, with the use of the multi-core optical fiber cable, which is better in flexibility than with the use of the single-core optical fiber cable, there is given a great advantage for cases involving flexibility, and moreover high-speed optical transmission can be carried out so that the signal cables can be mounted in a smaller number with higher flexibility.

In addition, a PCS (Polymer Clad Silica) fiber cable may also be used as the optical fiber cables 308, in which case high-speed optical transmission can be carried out with relatively low cost, so that the signal cables can be mounted in a smaller number with higher flexibility.

Figure 9A:
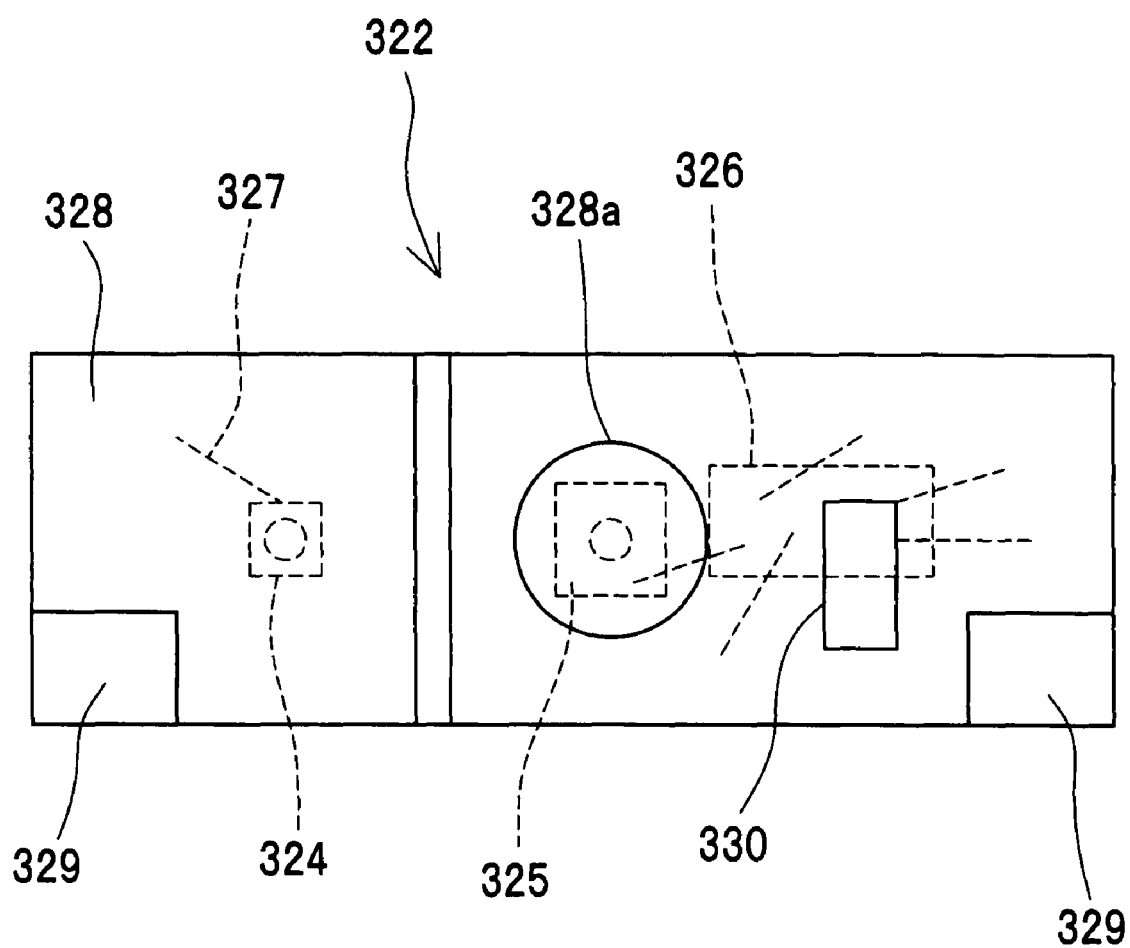
FIG. 9A is a front view of an optical element part.
Figure 9B:
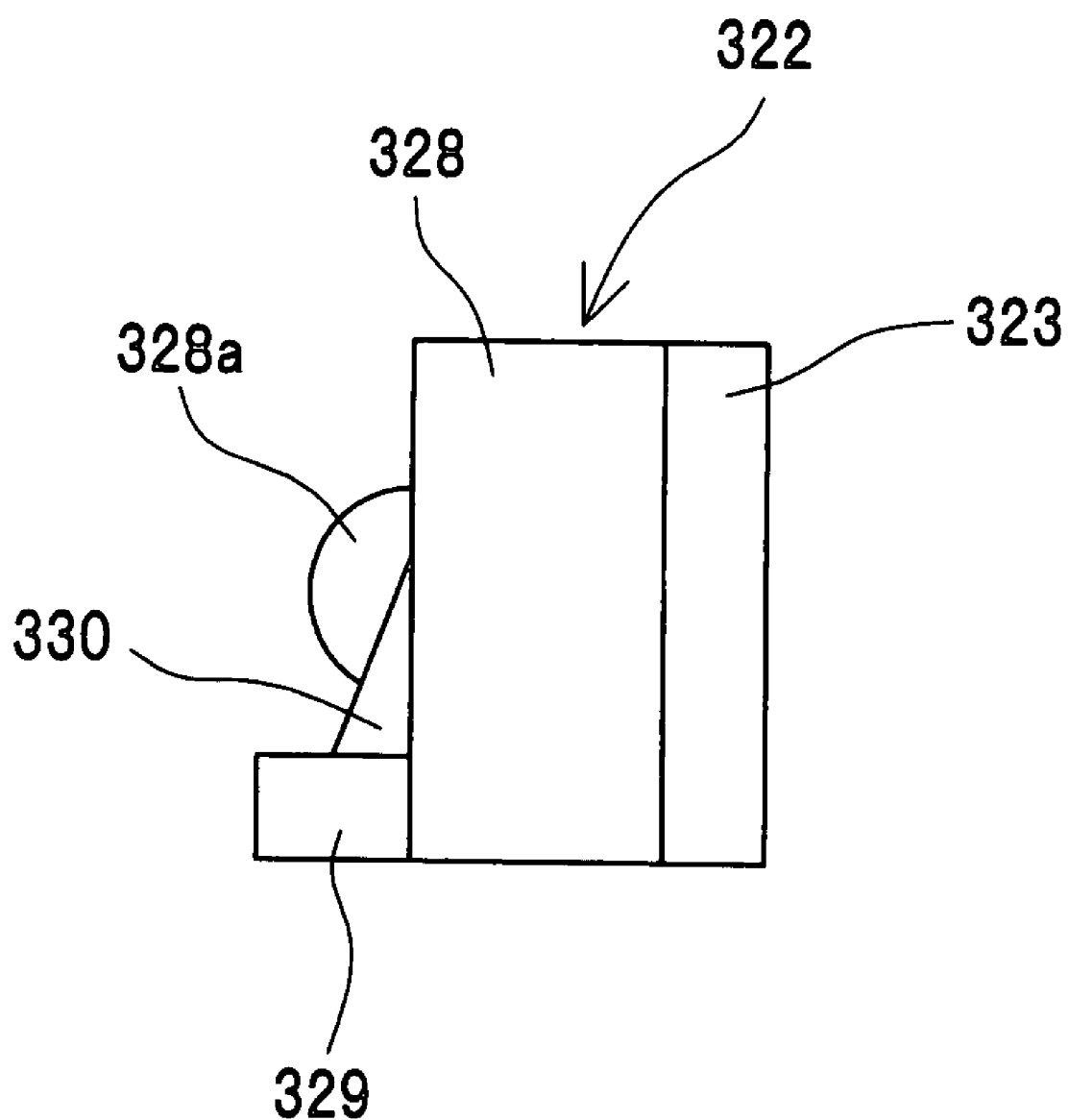
FIG. 9B is a side view of the optical element part.
Figure 9C:
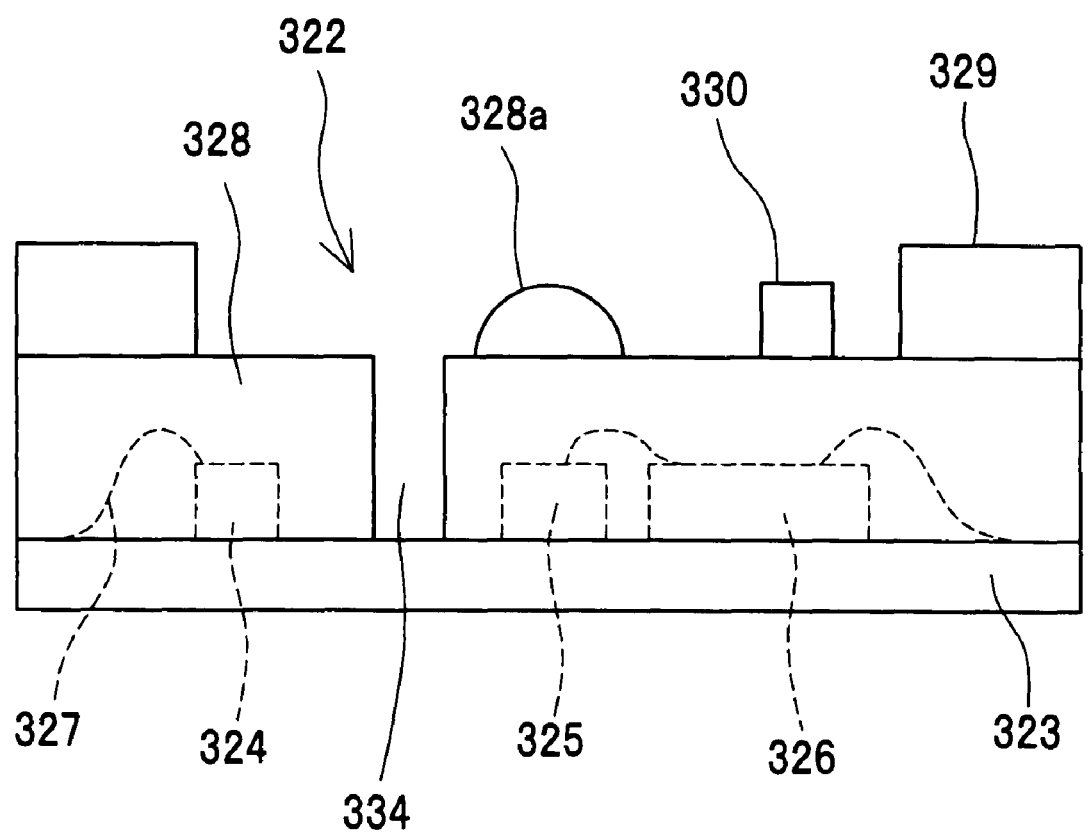
FIG. 9C is a top view of the optical element part.

As shown in FIGS. 9A, 9B and 9C, the optical element part 322 has a board 323, a light emitting element 324, a light receiving element 325 and an amplification electric circuit 326 mounted on one surface of the board 323, and a resin portion 328 for sealing the light emitting element 324, the light receiving element 325 and the amplification electric circuit 326.

The light emitting element 324, the light receiving element 325 and the amplification electric circuit 326 are die-bonded by Ag paste or other electrically conductive resin to electrodes, respectively, formed on the board 323.

The light emitting element 324, the light receiving element 325 and the amplification electric circuit 326 are electrically connected by bonding using Au wires or other wires 327 between those electrodes and electrodes formed on the board 323, respectively.

The resin portion 328, which is formed from epoxy resin as an example, is molded by transfer molding. A lens 328a is provided on one surface of the resin portion 328 for improvement of optical coupling efficiency.

Also, a fixing-use protruding portion 330 for fixation with the receptacle 331 is provided on one surface of the resin portion 328. A positioning-use protruding portion 329 for positioning with respect to the receptacle 331 is provided on one surface of the resin portion 328.

The lens 328a, the fixing-use protruding portion 330 and the positioning-use protruding portion 329 are molded by transfer molding.

Further, in the resin portion 328, a slit 334 intended for removal of optical crosstalk is provided between the light emitting element 324 and the light receiving element 325. This slit 334 is so lengthened as to stretch from upper to lower faces of the resin portion 328, and has such a depth as to reach the board 323. However, the slit 334 needs only to have such length and depth that optical crosstalk can be removed.

As the light emitting element 324, an LED or a VCSEL is used as an example. Therefore, concerning optical communications inside the portable telephone, the optical cable length is not more than 1 m at most, and therefore with plastic fiber used as the optical cables, the light emitting element can be used even in an emission wavelength of 850 nm or the like, in which the plastic optical fiber has a lower light transmissivity. As the light receiving element 325, a PD (Photo Diode) or PDIC is used. The resin portion 328, which is molded by transfer molding in the foregoing case, may also be molded by potting or other methods. Further, the fixing-use protruding portion 330 and the positioning-use protruding portion 329 may be provided on the surface of the resin portion 328 opposite to the surface on which the lens 328a is provided.

Figure 10A:
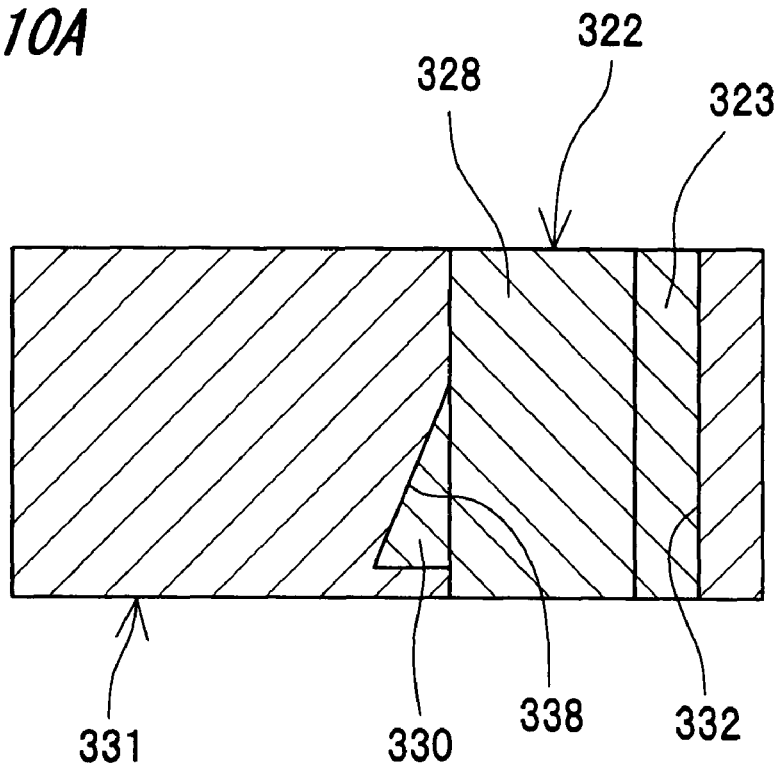
FIG. 10A is a sectional view of an optical element part at its fixing-use protruding portion, showing a fitting state between a receptacle and the optical element part.
Figure 10B:
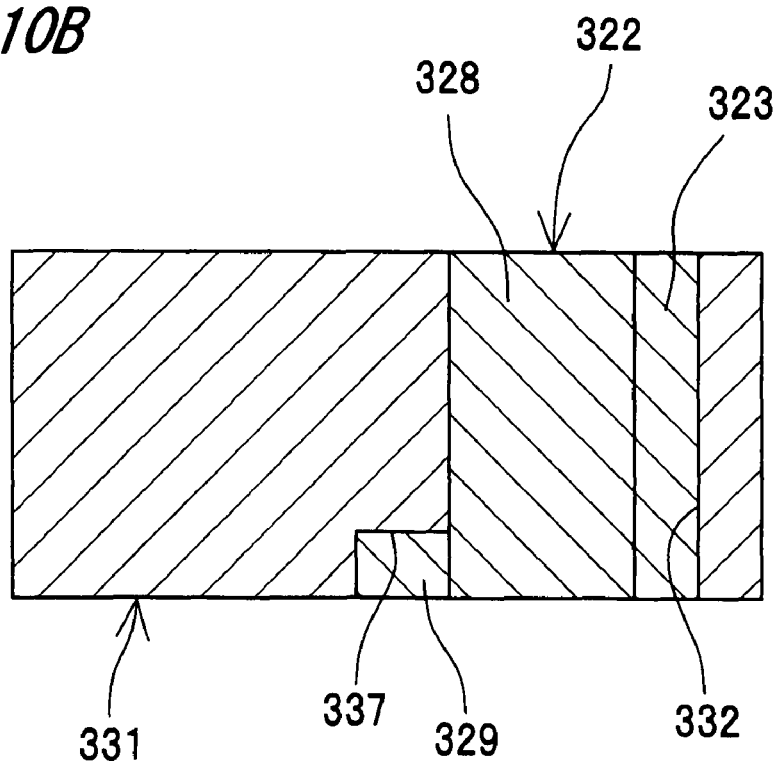
FIG. 10B is a sectional view of the optical element part at its positioning-use protruding portion, showing a fitting state between the receptacle and the optical element part.

As shown in FIGS. 10A and 10B, the receptacle 331 has an optical element part accommodating portion 332 to which the optical element parts 322 is to be fitted, and this optical element part accommodating portion 332 is provided in the form of a through hole. With the optical element part 322 fitted to the receptacle 331, one surface of the optical element part 322 and one surface of the receptacle 331 are placed so as to be generally flush with each other. The optical element part 322 is inserted from the bottom surface side of the receptacle 331.

FIG. 10A shows a sectional view of the receptacle 331 and the optical element part 322, taken at the fixing-use protruding portion 330 of the optical element part 322. FIG. 10B shows a sectional view of the receptacle 331 and the optical element part 322, taken at the positioning-use protruding portion 329 of the optical element part 322.

As shown in FIG. 10A, a fixing-use recessed portion 338 to be fitted to the fixing-use protruding portion 330 of the optical element part 322 is provided on an inner surface of the optical element part accommodating portion 332. That is, the receptacle 331 and the optical element part 322 have the fixing-use recessed portion 338 and the fixing-use protruding portion 330, respectively, as fixing-use engagement portions which are engaged and fixed with each other in the state that the optical element part 322 is fitted to the receptacle 331.

As shown in FIG. 10B, a positioning-use recessed portion 337 to be fitted to the positioning-use protruding portion 329 of the optical element part 322 is provided on an inner surface of the optical element part accommodating portion 332. That is, the receptacle 331 and the optical element part 322 have the positioning-use recessed portion 337 and the positioning-use protruding portion 329, respectively, which are engaged and positioned with each other as positioning-use engagement portions in the state that the optical element part 322 is fitted to the receptacle 331.

Figure 11A:
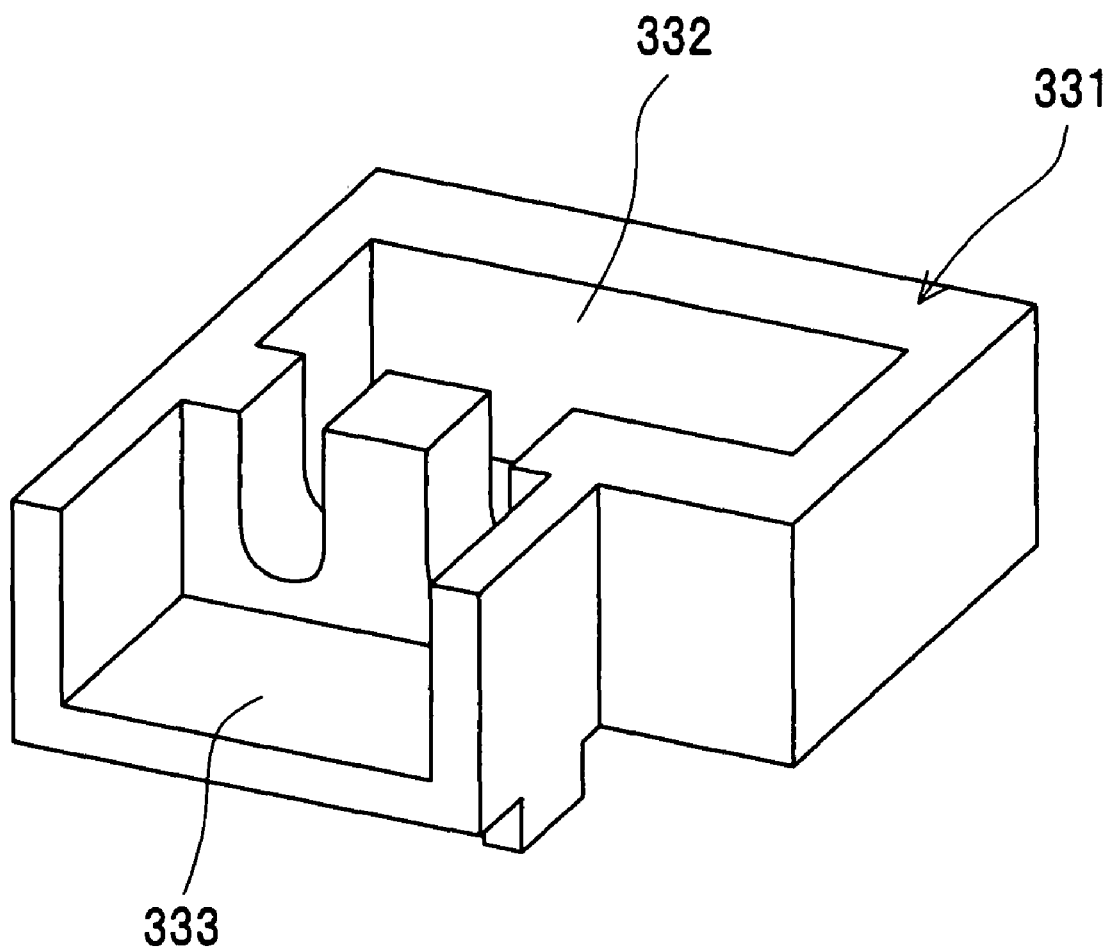
FIG. 11A is a top perspective view of the receptacle.
Figure 11B:
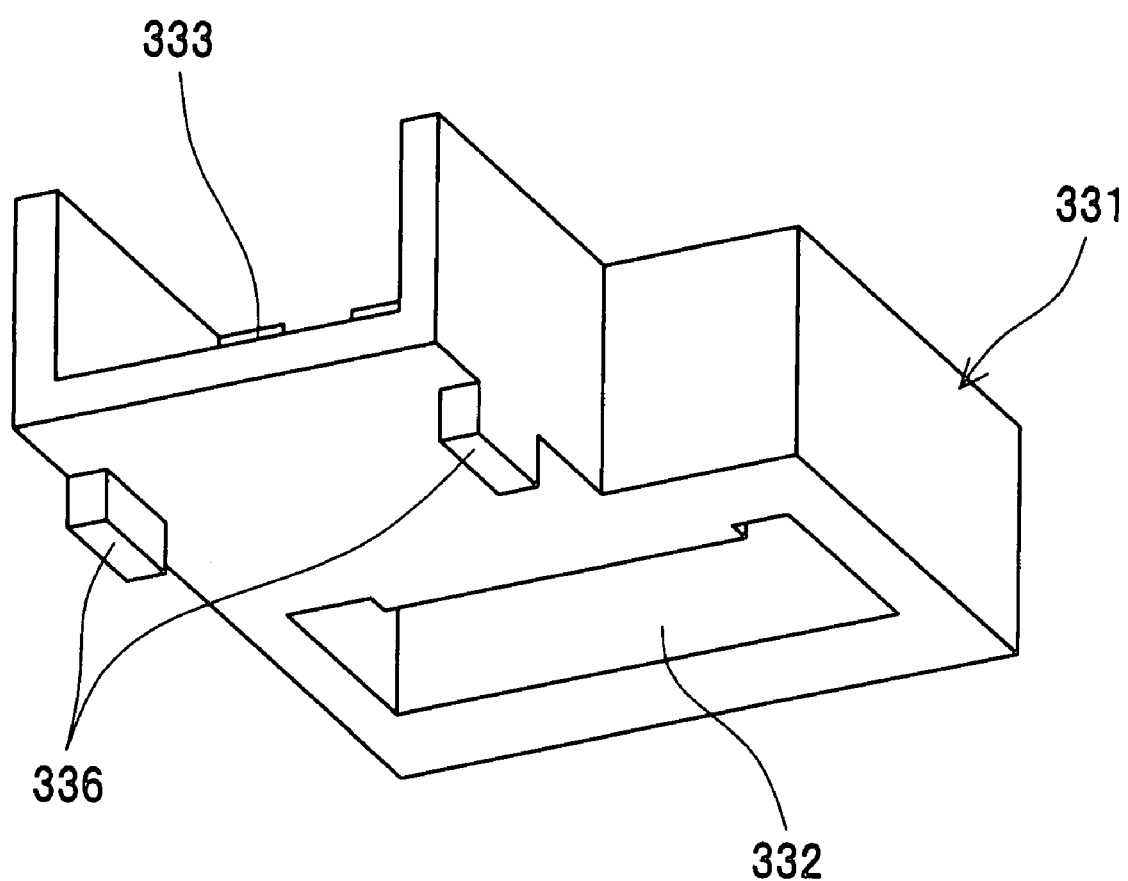
FIG. 11B is a bottom perspective view of the receptacle.

As shown in FIGS. 11A and 11B, the receptacle 331 has the optical element part accommodating portion 332 for accommodating therein the optical element part 322, and a plug accommodating portion 333 for accommodating therein the plug 307. In the receptacle 331, positioning-use protruding portions 336 are provided for use of positioning with respect to the boards 309, 310 of the first and the second casings 301, 302.

Next, the way how the optical element part 322 and the plug 307 are assembled to the receptacle 331 is described below.

Figure 12A:
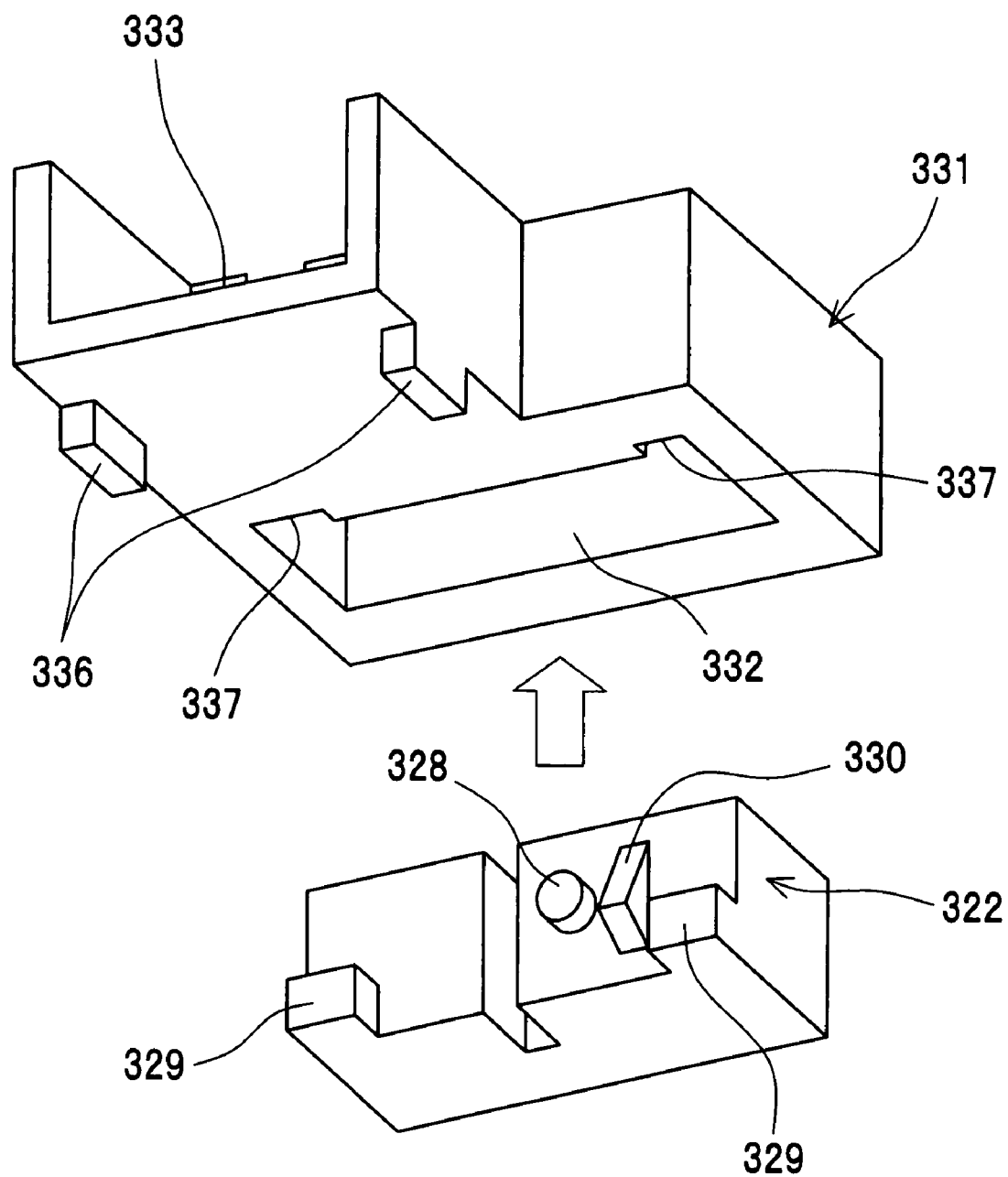
FIG. 12A is a bottom perspective view for explaining the fitting between the receptacle and the optical element part.

As shown in FIG. 12A, the optical element part 322 is inserted into the receptacle 331 from the bottom surface of the receptacle 331. The optical element part 322, which includes the positioning-use protruding portions 329, is inserted into the optical element part accommodating portion 332 until it comes to a stop of the insertion, i.e., the positioning-use protruding portions 329 and the positioning-use recessed portions 337 of the receptacle 331 come into a planar contact. In this state, positioning between the receptacle 331 and the optical element part 322 is performed.

Further, since the optical element part 322 includes the fixing-use protruding portion 330, the fixing-use protruding portion 330 of the optical element part 322 and the fixing-use recessed portion 338 of the receptacle 331 are fitted to each other as a result of the insertion of the optical element part 322 into the receptacle 331, so that the optical element part 322 is fixed to the receptacle 331.

With the optical element part 322 fitted to and held by the receptacle 331, the receptacle 331 is mounted onto the board 309 or 310 of the first casing 301 or the second casing 302 by making use of the positioning-use protruding portions 336, followed by electrical connection. This electrical connection may also be done by soldering or reflow soldering or by using connectors.

In this process, by virtue of the structure that the top surface of the receptacle 331 and the top surface of the optical element part 322 are generally flush with each other, it can be ascertained whether or not the optical element part 322 is positioned and fixed at a specified position of the receptacle 331.

Figure 12B:
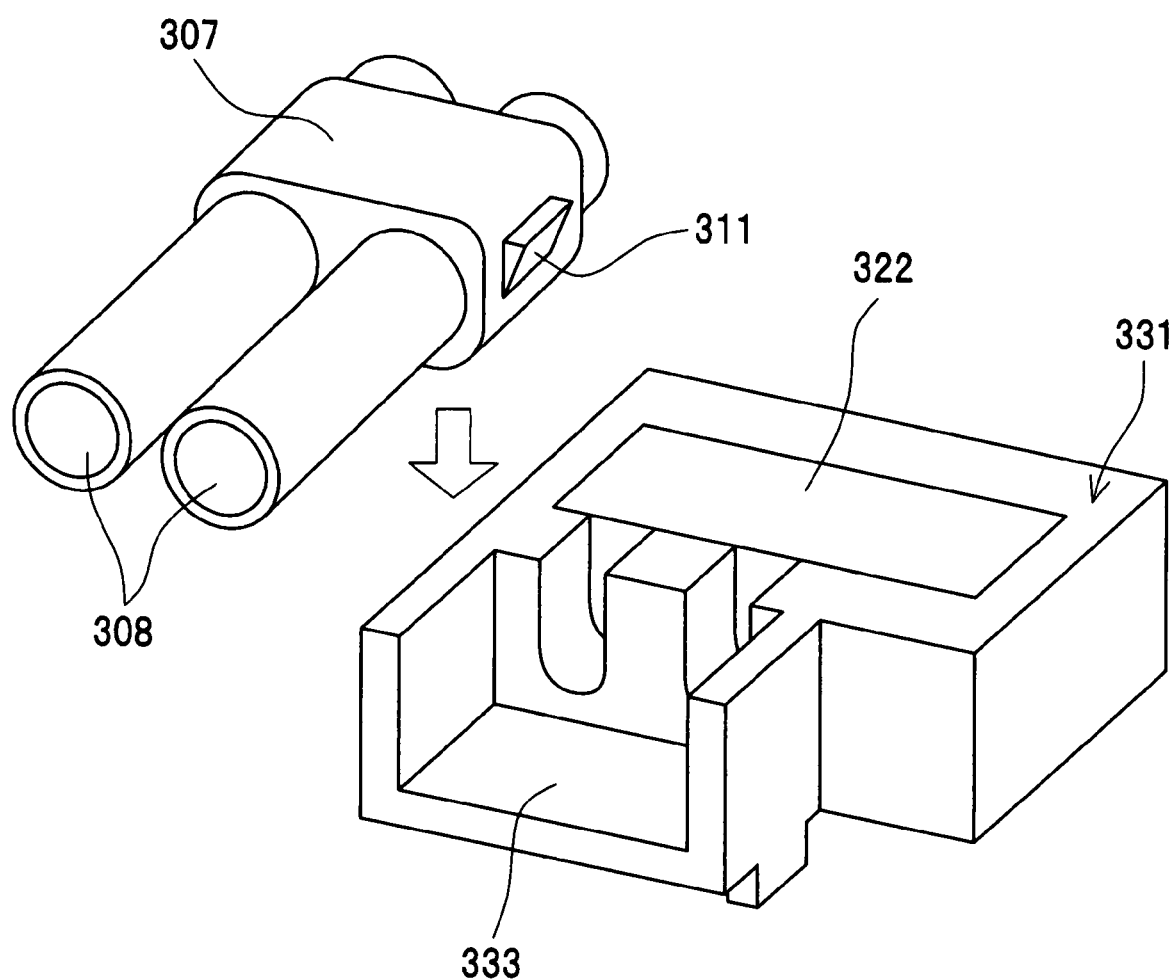
FIG. 12B is a top perspective view for explaining the fitting between the receptacle and the plug.

Thereafter, as shown in FIG. 12B, the plug 307 of one end of the optical fiber cables 308 is fitted to the plug accommodating portion 333 of the receptacle 331 in a direction perpendicular to the optical axis of the optical fiber cable 308, i.e., in a direction from the top surface of the receptacle 331, so that the plug 307 is fitted to and held by the receptacle 331. That is, with respect to the receptacle 331, the plug 307 of the optical fiber cable 308 and the optical element part 322 are fitted in a direction perpendicular to the optical axis of the optical fiber cable 308.

With the plug 307 fitted to the receptacle 331, the top surface of the plug 307 and the top surface of the receptacle 331 are placed so as to be generally flush with each other. Therefore, it can be ascertained whether or not the plug 307 is positioned and fixed at a specified position of the receptacle 331. Also, by virtue of the insertion and assembly processes that are effected to achieve surface flushness, any deterioration of optical coupling due to insufficient insertion can be prevented.

In addition, it is also possible that the optical element part 322 is inserted in a direction from the top surface of the receptacle 331 so as to be positioned and fixed to the receptacle 331.

According to the portable telephone constructed as described above, the optical signal transmission section 300 has the optical element parts 322 placed in the first casing 301 and the second casing 302, respectively, the optical fiber cables 308 that are stretched between the first casing 301 and the second casing 302 and that have the plugs 307 provided at their both ends, and the receptacles 331 that are placed in the first casing 301 and the second casing 302, respectively, and that optically couple together the optical element part 322 and the optical fiber cable 308 with the optical element part 322 fitted and held thereto and with the plugs 307 of the optical fiber cables 308 fitted and held thereto. Thus, it is no longer necessary to provide any optical connection member other than the fitting members of the plugs 307 and the receptacles 331, so that the parts count can be reduced, the structure can be simplified and that almost no factors of deterioration of optical coupling are involved.

Further, since the plug 307 and the optical element part 322 are fitted to the receptacle 331, the portable telephone can be reduced in size, and the optical fiber cables 308 and the optical element part 322 can be optically coupled together with reliability.

As a consequence, when the optical fiber cables 308 are connected to the board 309 or 310 of the first casing 301 or the second casing 302, all that is needed is only the fitting of the optical fiber cables 308 to the receptacle 331. Thus, a portable telephone which is good at workability and compact can be realized.

Naturally, since the portable telephone has the optical signal transmission section 300 that performs signal transmission with optical signals between the first casing 301 and the second casing 302, there is no occurrence of electromagnetic-wave noise from the optical signal transmission section 300, so that electromagnetic-wave noise of the whole portable telephone can be reduced to an extreme extent. Also, the shield for the optical signal transmission section 300 is no longer necessitated, making it possible to achieve a space saving, which is suited for internal connections of a compact portable telephone.

With respect to the receptacle 331, since the plug 307 of the optical fiber cables 308 and the optical element part 322 are fitted together in a direction perpendicular to the optical axis of the optical fiber cables 308, the plug 307 of the optical fiber cables 308 and the optical element part 322 can be easily assembled to the receptacle 331.

Since the optical fiber cables 308 are stretched between the first casing 301 and the second casing 302 through the inside of the hinge portion 303, the optical fiber cables 308 can be concealed inside the hinge portion 303, so that constraints on movable ranges of the first casing 301 and the second casing 302 are largely reduced. As a result, a portable telephone which allows the first casing 301 and the second casing 302 to be freely developed can be realized. Moreover, since there is no stress applied to the optical fiber cables 308, high-quality transmission can be carried out.

Accordingly, since the optical fiber cables 308 with the plug 307 provided thereon are passed through the inside of the hinge portion 303, it is allowed to perform an assembly inspection for the optical fiber cables 308 at a different place. As a result of this, there is no mixing of defects due to optical fiber cables 308 into the inspection, and end face processing of the optical fiber cables 308 can reliably be achieved. Therefore, less attenuations are achieved in the optical fiber cables 308 so that high-quality optical transmission can be carried out.

With the plugs 307 of the optical fiber cables 308 and the optical element part 322 fitted to the receptacle 331, one surface of the plug 307, one surface of the optical element part 322 and one surface of the receptacle 331 are placed so as to be generally flush with one another. Therefore, when the plug 307 and the optical element part 322 are assembled to the receptacle 331, it is required to make the plug 307, the optical element part 322 and the receptacle 331 flush with one another. Thus, it can be easily decided whether or not the optical coupling has securely been fulfilled.

The optical element part 322 has the light emitting element 324 and the light receiving element 325, and one of the optical fiber cables 308 optically couples together the light emitting element 324 of the first casing 301 and the light receiving element 325 of the second casing 302, while the other of the optical fiber cables 308 optically couples together the light receiving element 325 of the first casing 301 and the light emitting element 324 of the second casing 302. As a result, a compact portable telephone capable of bidirectional communications can be realized.

Since the optical element part 322 is fitted to the optical element part accommodating portion 332, which is a through hole for the receptacle 331, the receptacle 331 and the optical element part 322 can be made generally equal in height to each other. Thus, the receptacle 331 can be made lower in height, and an even more compact portable telephone can be realized.

The receptacle 331 and the optical element part 322 have the fixing-use protruding portion 330 and the fixing-use recessed portion 338, respectively, as fixing-use engagement portions which are engaged and fixed to each other in the state that the optical element part 322 is fitted to the receptacle 331. Therefore, since the optical element part 322 and the receptacle 331 are securely fitted and held to each other, a small-size receptacle 331 can be realized, so that a compact portable telephone can be realized. Further, since no additional fixing-use member is necessitated, a low-cost portable telephone can be realized.

Also, the receptacle 331 and the optical element part 322 have the positioning-use protruding portion 329 and the positioning-use recessed portion 337, respectively, as positioning-use engagement portions which are engaged and positioned to each other in the state that the optical element part 322 is fitted to the receptacle 331. Therefore, the receptacle 331 and the optical element part 322 can be positioned with reliability, so that a small-size, high transmission quality receptacle 331 can be realized, and that a compact, high-performance portable telephone can be realized. Further, since no additional positioning-use member is necessitated, a low-cost portable telephone can be realized.

In addition, it is also possible that the protruding portion 311 of the plug 307 is replaced by a recessed portion while the recessed portion of the receptacle 331 is replaced by a protruding portion. It is still also possible that the fixing-use protruding portion 330 is replaced by a recessed portion while the fixing-use recessed portion 338 is replaced by a protruding portion. It is yet also possible that the positioning-use protruding portion 329 is replaced by a recessed portion while the positioning-use recessed portion 337 is replaced by a protruding portion. Moreover, the positioning-use protruding portion 336 of the receptacle 331 may be replaced by a recessed portion.

Sixth Embodiment

Figure 13A:
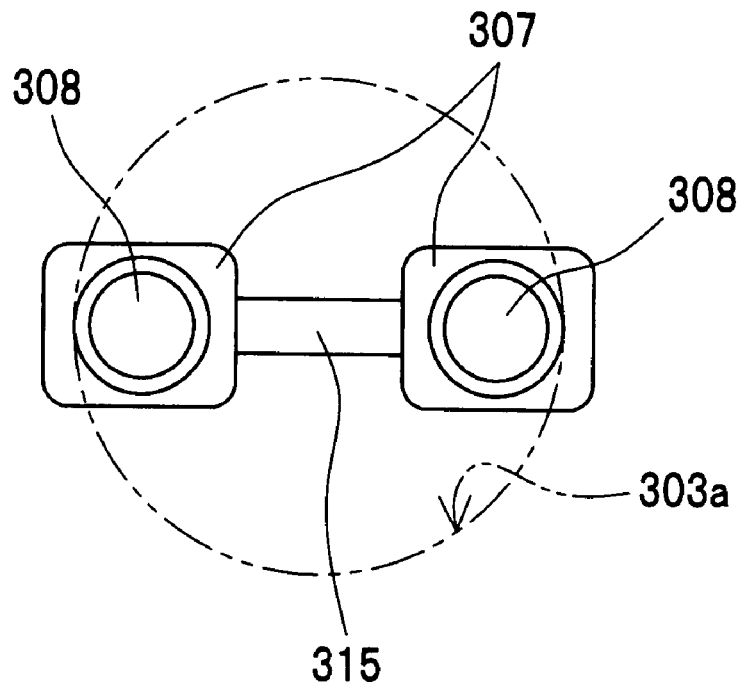
FIG. 13A is a front view showing a sixth embodiment of the portable telephone of the invention and showing a developed state of the plug.
Figure 13B:
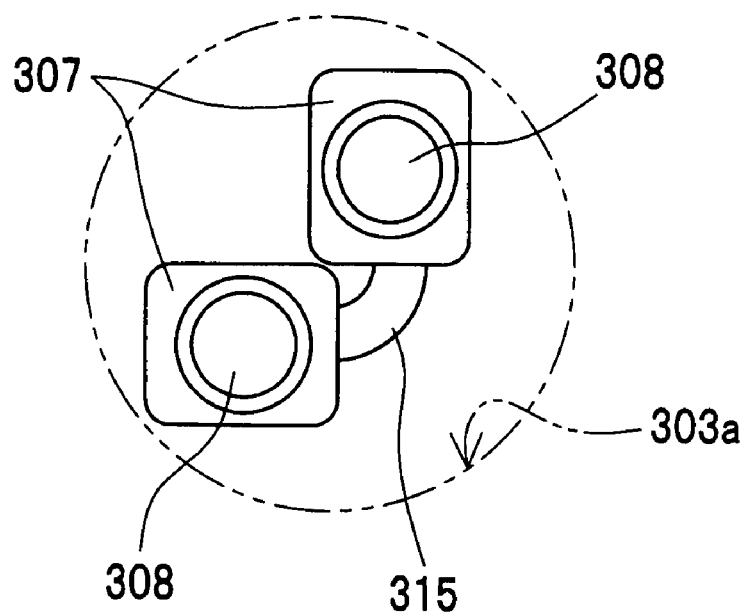
FIG. 13B is a front view showing a bent state of the plug.

FIGS. 13A and 13B show a sixth embodiment of the portable telephone of the invention. This sixth embodiment differs from the fifth embodiment in the makeup of the plug.

In the sixth embodiment, the optical fiber cables 308, which are provided two in number, are each provided with a plug 307, and adjacent plugs 307 are coupled to each other with a foldable bending portion 315.

The bending portion 315 is formed from a material having elasticity. In this case, a material having elasticity is used only for the bending portion 315. However, the whole plug 307 may also be formed from a material having elasticity.

As shown in FIG. 13A, in a normal state that no external force is applied to the integrated member of the plug 307 and the bending portion 315, the integrated member is larger than the diameter of the internal space 303a of the hinge portion 303 (shown by imaginary line), and cannot be passed through the internal space 303a of the hinge portion 303 as it is.

Accordingly, as shown in FIG. 13B, folding the bending portion 315 allows the integrated member to pass through the internal space 303a of the hinge portion 303. In this case, since the bending portion 315 is formed from a material having elasticity, bending the bending portion 315 never causes any damage of the integrated member.

Thus, the adjacent plugs 307 can be folded at the bending portion 315, and even with a small internal space 303a of the hinge portion 303, the optical fiber cables 308 can be passed through the internal space 303a of the hinge portion 303 while the bending portion 315 is kept folded. In this case, since the internal space 303a of the hinge portion 303 can be reduced in size, an even more compact portable telephone can be realized.

In addition, it is also possible that the optical fiber cables 308 are provided three or more in number, where each of the optical fiber cables 308 is provided with the plug 307 and adjacent plugs 307 are coupled to each other by the bending portion 315.

Seventh Embodiment

Figure 14A:
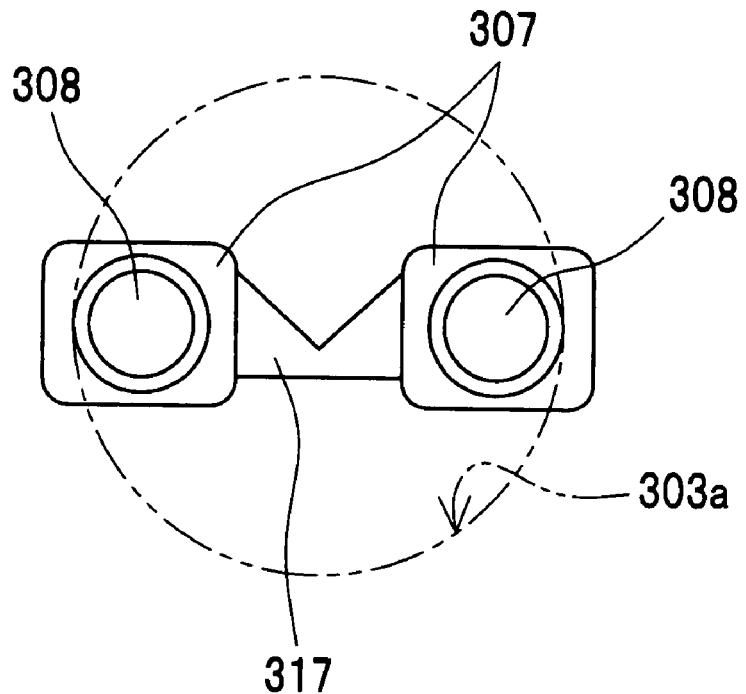
FIG. 14A is a front view showing a seventh embodiment of the portable telephone of the invention and showing a developed state of the plug.
Figure 14B:
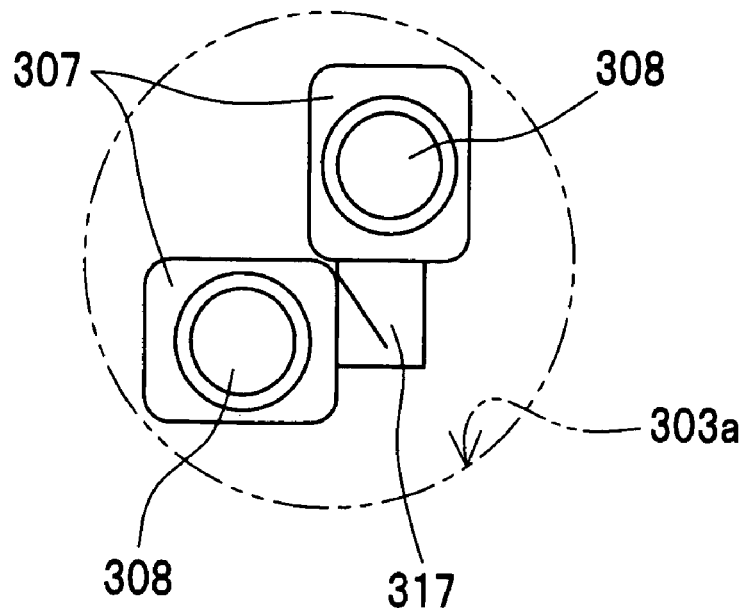
FIG. 14B is a front view showing a bent state of the plug.

FIGS. 14A and 14B show a seventh embodiment of the portable telephone of the invention. This embodiment differs from the sixth embodiment in the makeup of the bending portion. That is, a bending portion 317 has a roughly V-shaped groove in the seventh embodiment.

As shown in FIG. 14A, with no external force applied to the integrated member of the plugs 307 and the bending portion 317, the integrated member is larger than the diameter of the internal space 303a of the hinge portion 303 (shown by imaginary line), and cannot be passed through the internal space 303a of the hinge portion 303 as it is.

Accordingly, as shown in FIG. 14B, folding the bending portion 317 at the V-shaped groove allows the integrated member to pass through the internal space 303a of the hinge portion 303. In this case, since the bending portion 317 is formed from a material having elasticity, bending the bending portion 317 never causes any damage of the integrated member.

Thus, the adjacent plugs 307 can be folded at the bending portion 317, and even with a small internal space 303a of the hinge portion 303, the optical fiber cables 308 can be passed through the internal space 303a of the hinge portion 303 while the bending portion 317 is kept folded. In this case, since the internal space 303a of the hinge portion 303 can be reduced in size, an even more compact portable telephone can be realized.

In addition, it is also possible that the optical fiber cables 308 are provided three or more in number, where each of the optical fiber cables 308 is provided with the plug 307 and adjacent plugs 307 are coupled to each other by the bending portion 317. Further, the groove of the bending portion 317 may be so formed as to have a U-shaped groove or a plurality of bellows-like grooves.

Eighth Embodiment

Figure 15A:
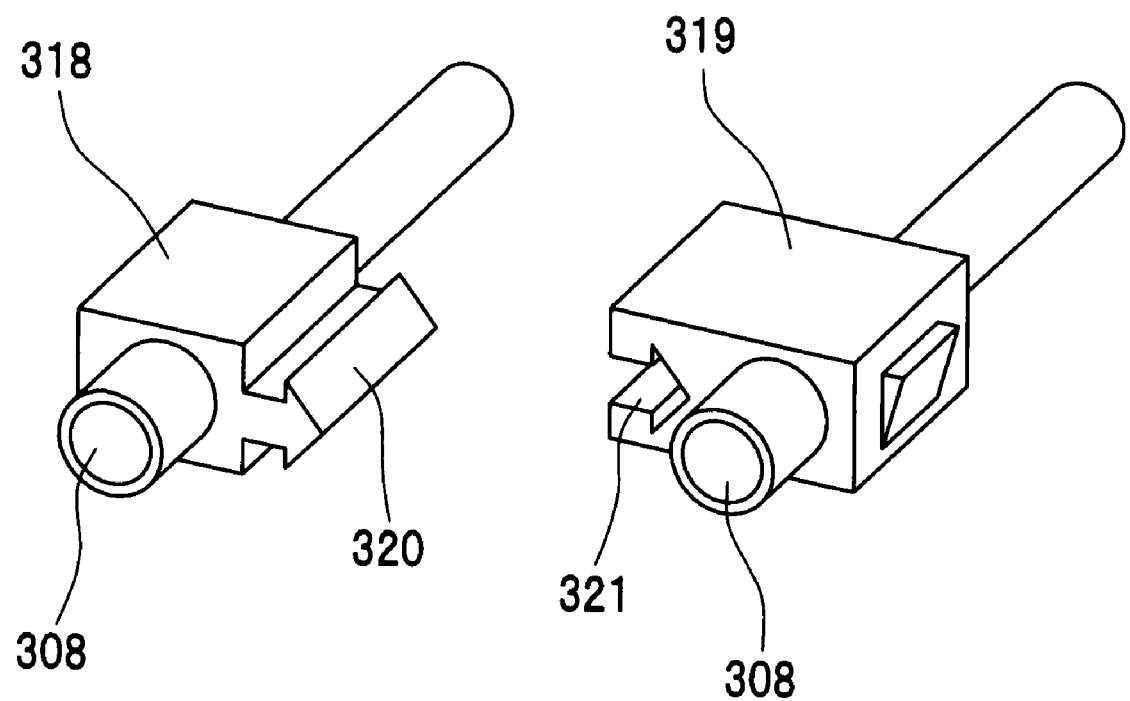
FIG. 15A is a perspective view showing an eighth embodiment of the portable telephone of the invention and showing a separated state of the plug.
Figure 15B:
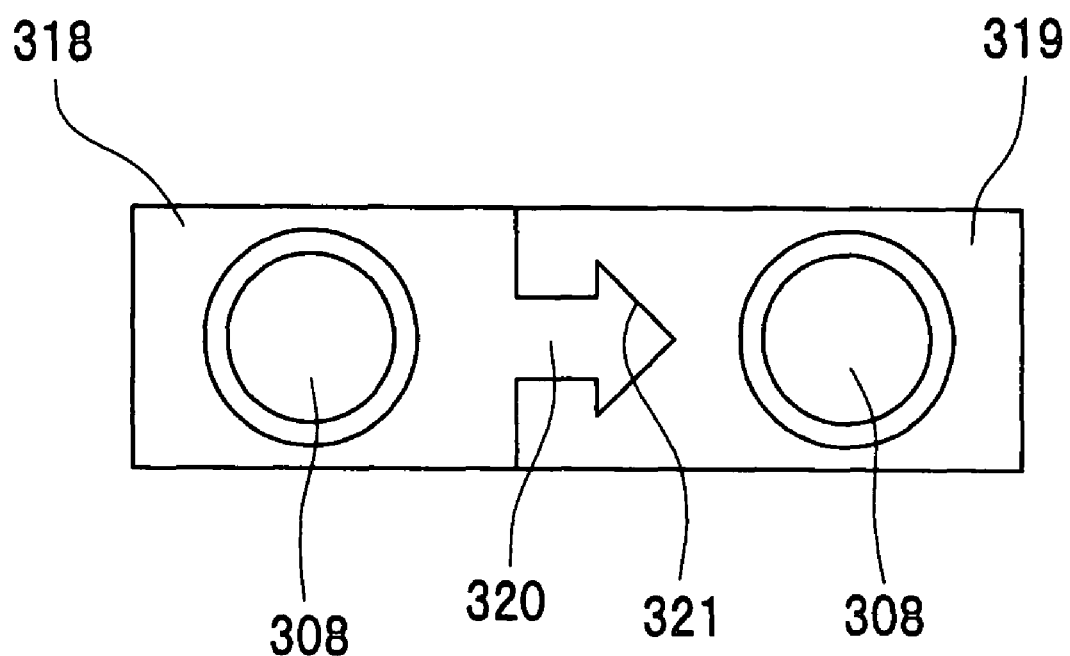
FIG. 15B is a front view showing a fitting state of the plug.

FIGS. 15A and 15B show an eighth embodiment of the portable telephone of the invention. This eighth embodiment differs from the fifth embodiment in the makeup of the plug.

In the eighth embodiment, the optical fiber cables 308 are provided two in number, where the individual optical fiber cables 308 are provided with plugs 318, 319, respectively, and the adjacent plugs 318, 319 have engagement portions, respectively, which are to be separably engaged with each other.

That is, one plug 318 of those has a plug-fitting use protruding portion 320 as an engagement portion, while the other plug 319 has a plug-fitting use recessed portion 321 as an engagement portion. The plug-fitting use protruding portion 320 and the plug-fitting use recessed portion 321 are so formed that the one plug 318 and the other plug 319 can be fitted to each other by sliding those plugs along the optical axis direction of the optical fiber cables 308. Instead, the engagement portions may also be so formed that the one plug 318 and the other plug 319 are fitted to each other by sliding those plugs along a direction perpendicular to the optical axis direction of the optical fiber cables 308.

Then, when the optical fiber cables 308 (see FIG. 7B) are passed through the internal space 303a of the hinge portion 303, the adjacent plugs 318, 319 are separated from each other and individually passed through the internal space 303a of the hinge portion 303, and thereafter, the adjacent plugs 318, 319 are engaged and integrated together, by which the plugs 318, 319 can be fitted to the receptacle 331. Thus, the internal space 303a of the hinge portion 303 can be reduced in size, so that a compact portable telephone can be manufactured.

Ninth Embodiment

Figure 16A:
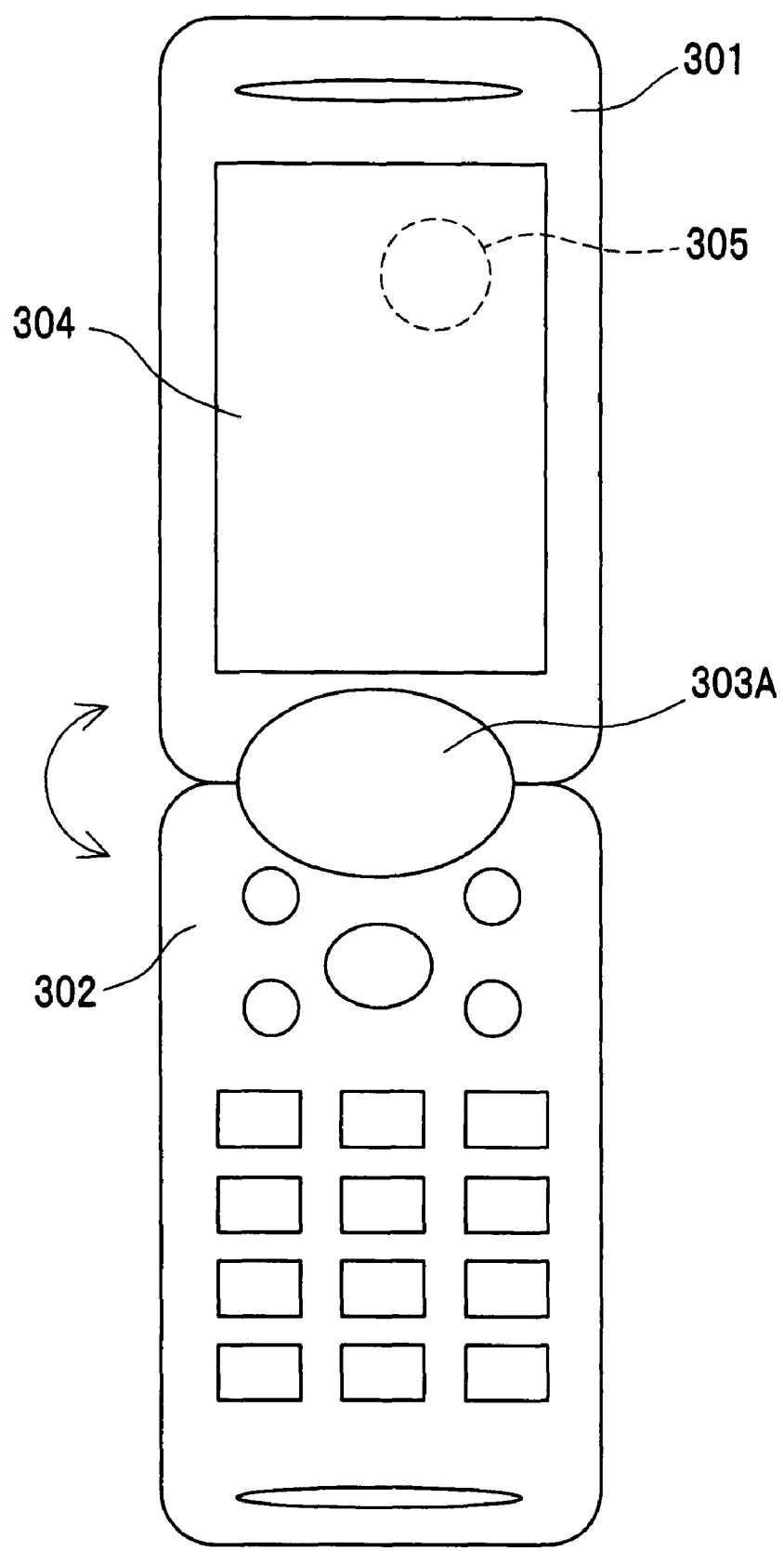
FIG. 16A is a front view showing a ninth embodiment of a portable telephone according to the present invention.
Figure 16B:
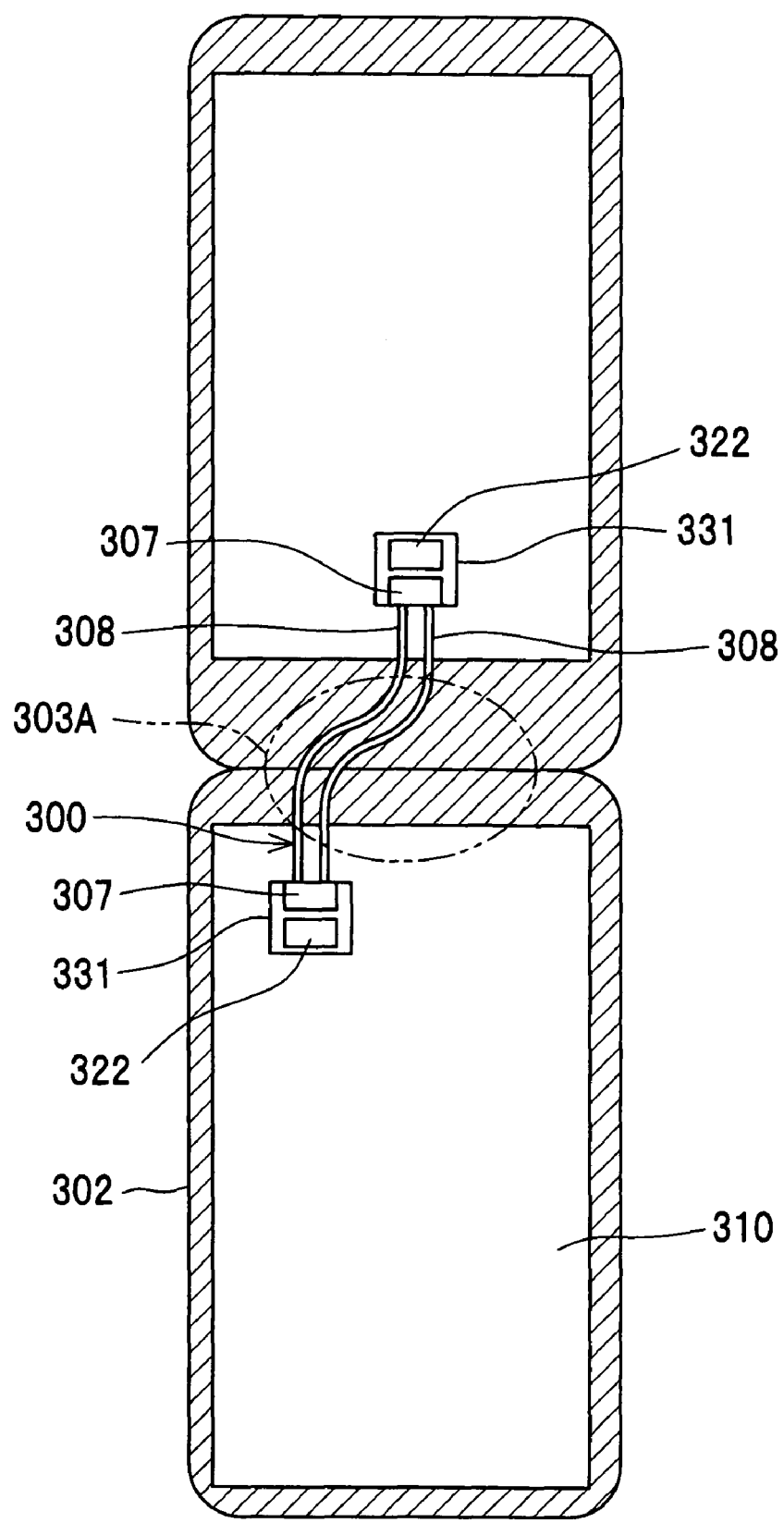
FIG. 16B is a front sectional view of FIG. 16A.

FIGS. 16A, 16B and 16C show a ninth embodiment of the portable telephone of the invention. This embodiment differs from the fifth embodiment in the way how the first casing 301 and the second casing 302 are folded and developed.

That is, in the fifth embodiment, the first casing 301 and the second casing 302 are so set that one side of each of the casings is swingable about an axis parallel to the one side. In contrast to this, in the ninth embodiment, the first casing 301 and the second casing 302 are so set that one side of each of the casings is swingable about an axis perpendicular to the one side.

As shown in FIGS. 16A to 16C, the first casing 301 and the second casing 302 are so set that one side of each of the casings is fixed by a cylindrical hinge portion 303A having an axis perpendicular to the one side.

In this case, the optical fiber cables 308 are passed through an internal space 303b of the hinge portion 303A so that the optical element part 322 of the first casing 301 and the optical element part 322 of the second casing 302 are optically coupled to each other. The rest of the structure is the same as in the fifth embodiment and so its description is omitted.

In addition, the way how the portable telephone is developed may also be a folding-in-two developing method or a turn developing method or other ones.

Tenth Embodiment

One embodiment of electronic equipment according to the invention, although not shown, includes a first casing 1 having a display panel, a second casing which has an operation section and which is coupled to the first casing so as to be foldable or developable, and an optical signal transmission section for performing signal transmission between the first casing and the second casing by optical signals.

The electronic equipment is exemplified by PDAs (Personal Digital Assistant), notebook PCs (Personal Computers), portable DVDs (Digital Versatile Discs), digital music equipment or other portable equipment. The first casing, the second casing and the optical signal transmission section of the electronic equipment are the same as those described in the foregoing first to ninth embodiments.

In the electronic equipment of this constitution, which includes the optical signal transmission section for performing signal transmission between the first casing and the second casing by optical signals, there is no occurrence of electromagnetic-wave noise from the optical signal transmission section, so that electromagnetic-wave noise of the whole electronic equipment can be reduced to an extreme extent. Also, the need for any shield for the optical signal transmission section is no longer necessitated, making it possible to provide electronic equipment which is ready for space saving and which is more compact.

In the foregoing first to tenth embodiments, the optical signal transmission section may also be used for optical transmission inside one casing without being limited to optical transmission between the first casing and the second casing.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A portable telephone comprising:
   a first casing having a display panel;
   a second casing which has an operation panel and which is coupled to the first casing so as to be foldable or developable; and
   an optical signal transmission section for performing signal transmission between the first casing and the second casing by optical signals, wherein
   the optical signal transmission section includes:
   optical element parts which are placed in the first casing and the second casing, respectively, and which perform at least one of transmission and reception of optical signals;
   an optical transmission medium which is stretched between the first casing and the second casing so as to optically couple the optical element part of the first casing and the optical element part of the second casing to each other and which has plugs provided at its both ends; and
   receptacles which are placed in the first casing and the second casing, respectively, and which have the plugs of the optical transmission medium fitted and held thereto while having the optical element parts fitted and held thereto so that the optical element parts and the optical transmission medium are optically coupled to each other, and wherein
   the receptacles allow the plugs of the optical transmission medium and the optical element parts to be fitted thereto along a direction perpendicular to an optical axis of the optical transmission medium, and
   the receptacles and the optical element parts have fixing-use engagement portions, respectively, which are to be engaged with and fixed to each other in a state that the optical element parts are fitted to the receptacles, respectively.

2. The portable telephone as claimed in claim 1, wherein a transmission speed of the optical signal transmission section is 400 Mbps or more.

3. The portable telephone as claimed in claim 1, wherein the optical transmission medium is a single-core plastic optical fiber cable.

4. The portable telephone as claimed in claim 1, wherein the optical transmission medium is a multi-core plastic optical fiber cable.

5. The portable telephone as claimed in claim 1, wherein the optical transmission medium is a multi-core glass fiber cable.

6. The portable telephone as claimed in claim 1, wherein the optical transmission medium is a polymer clad silica fiber cable.

7. The portable telephone as claimed in claim 1, wherein the first casing and the second casing are provided with a hinge portion by which the first casing and the second casing are coupled to each other so as to be foldable or developable, and
   the optical transmission medium is stretched between the first casing and the second casing by passing through inside of the hinge portion.

8. The portable telephone as claimed in claim 7, wherein the optical transmission medium is provided at least two in number, each of the optical transmission mediums being provided with the plugs, where adjacent ones of the plugs are coupled to each other by a foldable bending portion.

9. The portable telephone as claimed in claim 7, wherein
the optical transmission medium is provided at least two in number, each of the optical transmission mediums being provided with the plugs, where adjacent ones of the plugs have engagement portions, respectively, which are separably engageable with each other.

10. The portable telephone as claimed in claim 7, wherein
the receptacles have through holes into which the optical element parts are to be fitted, respectively.

11. The portable telephone as claimed in claim 10, wherein
the receptacles and the optical element parts have positioning-use engagement portions, respectively, which are to be engaged with and positioned to each other in a state that the optical element parts are fitted to the receptacles, respectively.

12. The portable telephone as claimed in claim 1, wherein
with the plugs of the optical transmission medium and the optical element parts fitted to the receptacles, respectively, one surface of one of the plugs, one surface of one of the optical element parts and one surface of one of the receptacles are placed so as to be substantially flush with one another.

13. The portable telephone as claimed in claim 1, wherein
each of the optical element parts has a light emitting element and a light receiving element, and
the optical transmission medium is provided two in number, where one optical transmission medium optically couples the light emitting element of the first casing and the light receiving element of the second casing to each other while the other optical transmission medium optically couples the light receiving element of the first casing and the light emitting element of the second casing to each other.

14. A portable telephone comprising:
a first casing having a display panel;
a second casing which has an operation panel and which is coupled to the first casing so as to be foldable or developable; and
an optical signal transmission section for performing signal transmission between the first casing and the second casing by optical signals, wherein
the first casing and the second casing are provided with a hinge portion by which the first casing and the second casing are coupled to each other so as to be foldable or developable;
the optical signal transmission section includes;
a light transmitting part which is placed in either one of the first casing or the second casing and which transmits an optical signal; and
a light receiving part which is placed in the other one of the first casing or the second casing and which receives an optical signal, and wherein
an optical signal transmitted from the light transmitting part is received by the light receiving part by optical space transmission; and
the placement of the light transmitting part and the light receiving part are such that when the first casing and the second casing are relatively rotated around the hinge portion into a developed state, the light transmitting part and the light receiving part move from being in an optically uncoupled position to being opposed and optically coupled to each other.

15. The portable telephone as claimed in claim 14, wherein
with the first casing and the second casing developed,
the first casing and the second casing have recess-and-protrusion structures for interrupting disturbance light at their portions corresponding to the light transmitting part and the light receiving part, respectively.

16. The portable telephone as claimed in claim 14, wherein
in the first casing and the second casing, boards are provided, respectively,
with the first casing and the second casing developed, the board of the first casing and the board of the second casing are inclined to each other at a specified angle, and
the light transmitting part is mounted on one of the boards of the first casing and the second casing so that an optical axis of the light transmitting part is inclined at a specified angle to a direction perpendicular to the one board,
while the light receiving part is mounted on the other one of the boards of the first casing and the second casing so that an optical axis of the light receiving part is inclined at a specified angle to a direction perpendicular to the other board, and wherein
with the first casing and the second casing developed, the optical axis of the light transmitting part and the optical axis of the light receiving part are coincident with each other.

17. The portable telephone as claimed in claim 14, wherein
the light receiving part includes:
a photodiode; and
a circuit which is integrated with the photodiode into one chip and which processes a signal of the photodiode.

* * * * *